United States Patent
Aijaz et al.

(10) Patent No.: US 12,225,583 B2
(45) Date of Patent: Feb. 11, 2025

(54) SCHEDULING SYSTEM AND METHOD FOR SCHEDULING TRANSMISSIONS FROM A CONTROLLER NODE TO A DOWNLINK NODE AND FROM AN UPLINK NODE TO THE CONTROLLER NODE

(71) Applicant: Kabushiki Kaisha Toshiba, Tokyo (JP)

(72) Inventors: Adnan Aijaz, Bristol (GB); Aleksandar Stanoev, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 455 days.

(21) Appl. No.: 17/583,346

(22) Filed: Jan. 25, 2022

(65) Prior Publication Data
US 2023/0239925 A1 Jul. 27, 2023

(51) Int. Cl.
*H04W 74/0816* (2024.01)
*H04W 72/0446* (2023.01)
(Continued)

(52) U.S. Cl.
CPC ... *H04W 74/0816* (2013.01); *H04W 72/0446* (2013.01); *H04W 72/1263* (2013.01); *H04W 72/569* (2023.01)

(58) Field of Classification Search
CPC ............. H04W 84/20; H04W 72/0446; H04W 72/569; H04W 72/1263; H04W 74/0816; H04W 74/0808
See application file for complete search history.

(56) References Cited

U.S. PATENT DOCUMENTS

| | | |
|---|---|---|
| 2006/0165026 A1* | 7/2006 | Apneseth ............. G05B 19/414 370/322 |
| 2007/0223497 A1 | 9/2007 | Elson et al. |

(Continued)

OTHER PUBLICATIONS

Elson et al., "Fine-Grained Network Time Synchronization using Reference Broadcasts", ACM SIGOPS Operating Systems Review, 36, 2002, 15 pages.

(Continued)

*Primary Examiner* — Allahyar Kasraian
(74) *Attorney, Agent, or Firm* — Oblon, McClelland, Maier & Neustadt, L.L.P.

(57) ABSTRACT

A method for scheduling transmissions between a controller node, one or more, and one or more uplink nodes comprising: defining one or more non-overlapping downlink and uplink timeslots within a maximum cycle time period; scheduling each of the downlink nodes to listen to receive a respective downlink transmission from a one or multiple radios of the controller node in one of the downlink timeslots on one of a plurality of channels such that none of the downlink transmissions conflict with each other; and scheduling each of the uplink nodes to transmit a respective uplink transmission to a controller radio in one of the uplink timeslots on one of the channels such that none of the uplink transmissions conflict with each other. Each of the downlink nodes is scheduled to listen on a same channel as another if it is possible to do so without any of the respective downlink transmissions conflicting; and each of the uplink nodes is scheduled to transmit on a same channel as another if it is possible to do so without any of the respective uplink transmissions conflicting.

19 Claims, 6 Drawing Sheets

(51) Int. Cl.
*H04W 72/1263* (2023.01)
*H04W 72/566* (2023.01)

(56) References Cited

U.S. PATENT DOCUMENTS

| | | | |
|---|---|---|---|
| 2008/0212501 A1* | 9/2008 | Harrang | H04W 72/1263 370/281 |
| 2009/0146791 A1* | 6/2009 | Jantunen | H04B 5/00 340/10.2 |
| 2018/0302899 A1 | 10/2018 | Aijaz | |
| 2018/0302908 A1 | 10/2018 | Aijaz | |
| 2021/0084675 A1 | 3/2021 | Aijaz et al. | |
| 2021/0144666 A1 | 5/2021 | Sivasiva Ganesan et al. | |

OTHER PUBLICATIONS

Aijaz et al., "GALLOP: Toward High-Performance Connectivity for Closing Control Loops over Multi-hop Wireless Networks", RTNS '19: Proceedings of the 27th International Conference on Real-Time Networks and Systems, 2019, 11 pages.

\* cited by examiner

SCHEDULING SYSTEM AND METHOD FOR SCHEDULING TRANSMISSIONS FROM A CONTROLLER NODE TO A DOWNLINK NODE AND FROM AN UPLINK NODE TO THE CONTROLLER NODE

FIELD

Embodiments described herein relate to methods and systems for scheduling transmissions in wireless networks, to methods of performing such transmissions and to systems and components thereof configured to perform such methods.

Further embodiments described herein relate to methods for synchronizing nodes of a wireless single hop network, and to systems and components thereof configured to perform such methods.

BACKGROUND

Closed loop control (or feedback control) is a method of automatically controlling a process to obtain desired set points or ranges of one or more measured process variables. Closed loop control systems are widely used in a range of legacy industries, including manufacturing, oil and gas, chemical processing, and power systems, as well as emerging industrial applications, including large-scale battery management systems, formation control of mobile robots or unmanned aerial vehicles (UAVs), vehicle platooning, and teleoperation.

In some closed loop control systems, a controller may be spatially distributed from one or more actuators that regulate a process and one or more sensors that measure one or more process variables. Such systems may require bi-directional communications to and from the sensor. In such systems, a cycle time (or latency) is defined as the total time taken for the controller to successfully transmit downlink control signals to each of the one or more actuators and receive uplink feedback from each of the one or more sensors.

The required cycle time for an industrial closed loop system depends on its industrial application and can be very low, i.e. on the order of 100 milliseconds. For example, wireless control of battery systems require a cycle time of 120 milliseconds. Other industrial applications require ultra-low cycle times, i.e. on the order of 100 microseconds. For example, a motion control system for controlling moving or rotating parts of parts of a machine can require a cycle time of 250 to 500 microseconds.

Some industrial applications may also require low jitter (variation between cycle times of different cycles). For example, electric vehicle motor gate control may require a cycle time of 200 microseconds with a maximum jitter of 0.5 microseconds. Achieving low jitter requires tight synchronization between the wirelessly communicating elements of the system.

Implementing closed loop control systems wirelessly advantageously offers low-cost installation and maintenance. However, such wireless industrial closed loop control systems must typically have very low latency, very high reliability (successful packet delivery rates), minimal jitter, high scalability (support for large and potentially varying numbers of actuators and sensors) and tight synchronization.

There is therefore a need for novel wireless solutions for operating wireless closed loop control systems with low latency and precise synchronization.

Arrangements of the embodiments will be understood and appreciated fully from the following detailed description, made by way of example only and taken in conjunction with the drawings in which.

DETAILED DESCRIPTION

Figure 1:
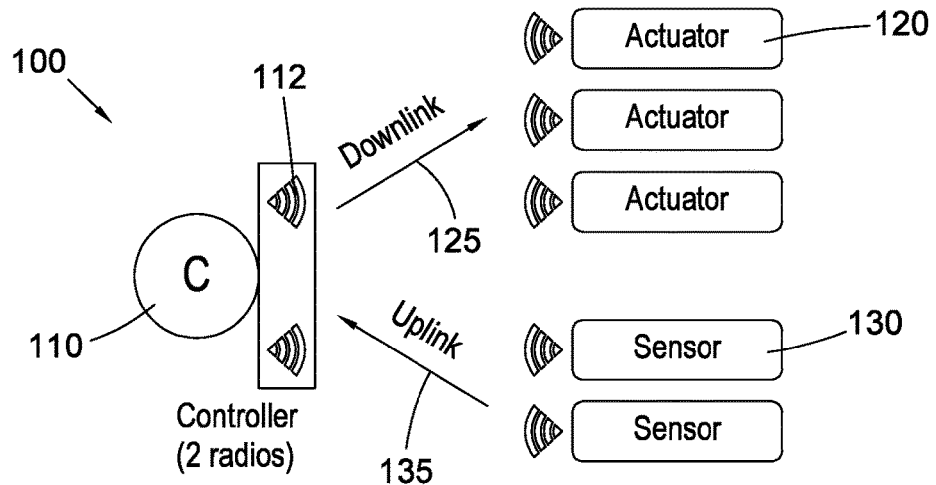
FIG. 1 shows an example of a single-hop wireless closed-loop control system.

According to an embodiment, there is provided a method for scheduling transmissions from a controller node comprising a plurality of radios to one or more downlink nodes and from one or more uplink nodes to the controller node, the method comprising: defining one or more downlink timeslots and one or more uplink timeslots within a maximum cycle time period, wherein the downlink timeslots and uplink timeslots do not overlap with each other; scheduling each of the one or more downlink nodes to listen to receive a respective downlink transmission from a radio of the radios of the controller node in one of the one or more downlink timeslots on a channel of a plurality of channels such that none of the respective downlink transmissions to the one or more downlink nodes conflict with each other; scheduling each of the one or more uplink nodes to transmit a respective uplink transmission to a radio of the radios of the controller node in one of the one or more uplink timeslots on a channel of the plurality of channels such that none of the respective uplink transmissions from the one or more uplink nodes conflict with each other; wherein each of the one or more downlink nodes is scheduled to listen to receive the respective downlink transmission on a channel of the one or more channels on which another of the one or more downlink nodes is scheduled to listen if it is possible to do so without any of the respective downlink transmissions to the one or more downlink nodes conflicting with each other; and wherein each of the one or more uplink nodes is scheduled to transmit the respective uplink transmission on a channel of the one or more channels on which another of the one or more uplink nodes is scheduled to transmit if it is possible to do so without any of the respective uplink transmissions from the one or more uplink nodes conflicting with each other.

In some embodiments each of the one or more uplink nodes may be scheduled to transmit the respective uplink transmission on a channel of the plurality of channels on which none of the downlink nodes are scheduled to listen to receive.

In some embodiments, any of the one or more downlink nodes that are scheduled to listen receive the respective downlink transmissions on the same channel are scheduled to receive the respective downlink transmission from the same radio of the plurality of radios of the controller and any of the one or more uplink nodes that are scheduled to transmit the respective uplink transmissions on the same channel are scheduled to transmit the respective uplink transmissions to the same radio of the plurality of radios of the controller.

In some such embodiments, any of the one or more downlink nodes that are scheduled to listen receive the respective downlink transmissions on different channels are scheduled to receive the respective downlink transmission from different radios of the plurality of radios of the controller and any of the one or more uplink nodes that are scheduled to transmit the respective uplink transmissions on different channels are scheduled to transmit the respective uplink transmissions to different radios of the plurality of radios of the controller.

In some embodiments, each the one or more downlink nodes is scheduled to listen to receive the respective downlink transmission in the earliest of the one or more downlink timeslots on the channel that does not cause any of the respective downlink transmissions to the one or more downlink nodes to conflict with each other; and each the one or more uplink nodes is scheduled to transmit the respective uplink transmission in the earliest of the one or more uplink timeslots on the channel that does not cause any of the respective uplink transmissions to the one or more uplink nodes to conflict with each other.

In some embodiments, the one or more uplink timeslots are a plurality of pairs of uplink timeslots each comprising a first uplink timeslot and a subsequent second uplink timeslot, wherein each of the one or more uplink nodes is scheduled to transmit a respective uplink transmission to one of the radios of the controller node in both uplink timeslots of one of the one or more pairs of uplink timeslots on a channel of the plurality of channels such that none of the respective uplink transmissions from the one or more uplink nodes conflict with each other.

In some such embodiments, the method further comprises pairing at least one of the one or more uplink nodes with at least one of the one or more downlink nodes; scheduling the at least one downlink node paired with each uplink node to listen to receive the respective uplink transmission transmitted by that uplink node in the first uplink timeslot of the pair of uplink timeslots in which that uplink node is scheduled to transmit; and scheduling the at least one downlink node paired with each uplink node to listen to transmit the respective uplink transmission transmitted by that uplink node in the second uplink timeslot of the pair of uplink timeslots in which that uplink node is scheduled to transmit.

In some such embodiments, each of the one or more uplink nodes is paired with at least one of the one or more downlink nodes.

In some embodiments, the one or more downlink nodes are a plurality of downlink nodes and the method comprises scheduling multiple downlink nodes of the plurality of downlink nodes to listen to receive the respective downlink transmissions during the same downlink timeslot and aggregating the respective downlink transmissions of the multiple downlink nodes into a single packet to be transmitted to the multiple downlink nodes in the downlink timeslot.

In some embodiments, the numbers of downlink timeslots and of uplink timeslots defined within the maximum cycle time are determined based on at least: a duration of the maximum cycle time, the number of downlink nodes, and the number of uplink nodes.

In some embodiments, the numbers of downlink timeslots and of uplink timeslots or pairs thereof may also be determined based on: a number of radios comprised by the controller node; parameters of the physical layer on which the uplink transmissions and downlink transmissions are made, parameters of payloads transmitted to each of the downlink nodes and by each of the uplink nodes, and/or the number of actuators whose respective downlink transmissions can be aggregated into a single packet.

In some embodiments, the controller, the one or more downlink nodes and the one or more uplink nodes are comprised by a closed-loop control system, and each of the one or more downlink nodes is an actuator and each of the one or more uplink nodes is a sensor.

In some embodiments, the method comprises each of the downlink nodes transmitting a request message to the controller node, the controller scheduling that downlink node to listen to receive the respective downlink transmission from the controller node and transmitting a message specifying the downlink time window in which the downlink node is scheduled to listen in to that downlink node; and each of the uplink nodes transmitting a request message to the controller node, the controller scheduling that uplink node to transmit the respective uplink transmission to the controller node and transmitting a message specifying the uplink timeslot pair in which the uplink node is scheduled to transmit to that uplink node.

In some embodiments, wherein each of downlink nodes and uplink nodes transmit request messages to, are scheduled by, and listen to receive the respective downlink transmission from the controller node in an order of priorities assigned by the controller node.

According to another embodiment, there is provided a system comprising a controller node, one or more uplink nodes, and one or more downlink nodes, wherein the controller node comprises a plurality of radios, the system being configured to: define one or more downlink timeslots and one or more uplink timeslots within a maximum cycle time period, wherein the downlink timeslots and uplink timeslots do not overlap with each other; schedule each of the one or more downlink nodes to listen to receive a respective downlink transmission from a radio of the radios of the controller node in one of the one or more downlink timeslots on a channel of a plurality of channels such that none of the respective downlink transmissions to the one or more downlink nodes conflict with each other; schedule each of the one or more uplink nodes to transmit a respective uplink transmission to a radio of the radios of the controller node in one of the one or more uplink timeslots on a channel of the plurality of channels such that none of the respective uplink transmissions from the one or more uplink nodes conflict with each other; wherein each of the one or more downlink nodes is scheduled to listen to receive the respective downlink transmission on a channel of the one or more channels on which another of the one or more downlink nodes is scheduled to listen if it is possible to do so without any of the respective downlink transmissions to the one or more downlink nodes conflicting with each other; and wherein each of the one or more uplink nodes is scheduled to transmit the respective uplink transmission on a channel of the one or more channels on which another of the one or more uplink nodes is scheduled to transmit if it is possible to do so without any of the respective uplink transmissions from the one or more uplink nodes conflicting with each other.

The system may be configured to perform any of the optional steps described herein with reference to a method of scheduling transmissions.

According to another embodiment, there is provided a controller node comprising a plurality of radios, the controller node being configured to: transmit a respective downlink transmission packet to each of one or more downlink nodes using a radio of the plurality of radios in a downlink timeslot of one or more downlink timeslots on a channel of a plurality of channels such that none of the respective downlink transmissions to the one or more downlink nodes conflict with each other; listen to receive a respective uplink transmission from each of one or more uplink nodes using a radio of the plurality of radios in an uplink timeslot of one or more uplink timeslots on a channel of the plurality of channels such that none of the respective uplink transmissions from the one or more uplink nodes conflict with each other; wherein each of the one or more downlink transmission packets is transmitted on a channel of the one or more channels on which a downlink transmission packet to another of the one or more downlink nodes is transmitted if it is possible to do so without any of the respective downlink transmissions to the one or more downlink nodes conflicting with each other; and wherein each of the one or more uplink transmission packets is listened for on a channel of the one or more channels on which another of the one or more uplink transmission packets is listened for if it is possible to do so without any of the respective uplink transmissions from the one or more uplink nodes conflicting with each other; wherein the one or more downlink timeslots and one or more uplink timeslots are within a maximum cycle time period and wherein the downlink timeslots and uplink timeslots do not overlap with each other.

The controller node may be further configured to schedule the one or more uplink transmissions and one or more downlink transmissions using a method of scheduling as described herein. The controller node may be configured to perform any optional step of a method described herein.

According to another embodiment, there is provided a method of performing transmissions from a controller node comprising a plurality of radios to one or more downlink nodes and from one or more uplink nodes to the controller node, the method comprising: transmitting a respective downlink transmission packet from the controller node to each of one or more downlink nodes using a radio of the plurality of radios in a downlink timeslot of one or more downlink timeslots on a channel of a plurality of channels such that none of the respective downlink transmissions to the one or more downlink nodes conflict with each other; listening to receive a respective uplink transmission from each of one or more uplink nodes using a radio of the plurality of radios in an uplink timeslot of one or more uplink timeslots on a channel of the plurality of channels such that none of the respective uplink transmissions from the one or more uplink nodes conflict with each other; wherein each of the one or more downlink transmission packets is transmitted on a channel of the one or more channels on which a downlink transmission packet to another of the one or more downlink nodes is transmitted if it is possible to do so without any of the respective downlink transmissions to the one or more downlink nodes conflicting with each other; and wherein each of the one or more uplink transmission packets is listened for on a channel of the one or more channels on which another of the one or more uplink transmission packets is listened for if it is possible to do so without any of the respective uplink transmissions from the one or more uplink nodes conflicting with each other; wherein the one or more downlink timeslots and one or more uplink timeslots are within a maximum cycle time period and wherein the downlink timeslots and uplink timeslots do not overlap with each other.

The method may further comprise scheduling the one or more uplink and downlink transmissions using a method of scheduling as described herein. The method may comprise any other optional step described herein.

According to another embodiment there is provided one or more non-transitory storage media comprising computer instructions executable by a one or more processing means, the computer instructions when executed by the processing means causing the processing means to perform a method for scheduling transmissions as described above.

The method may comprise any optional feature of a method described herein.

According to another embodiment, there is provided one or more non-transitory storage media comprising computer instruction executable by one or more processing means, the computer instructions when executed by the processing means causing the processing means to perform a method of performing transmissions as described herein. The method may comprise any optional features described herein.

Embodiments described herein relate to methods for scheduling and operating closed-loop control systems and to closed-loop control systems or components thereof configured to employ such methods.

FIG. 1 shows an example of a feedback (closed-loop) control system 100. The system 100 comprises a controller 110, three actuators 120 and two sensors 130. Each of the actuators 120 is configured to regulate a process in response to downlink instructions 125 from the controller 110 and each of the sensors 130 is configured to transmit uplink feedback 135 to the controller 110 based on measurements of one or more variables of the process or processes regulated by the actuators.

The controller 110, actuators 120, and sensors 130 are spatially distributed and each comprise radios 112, 122, 132 that are all configured to communicate via a shared transmission medium using one or more shared physical (PHY) layers. The actuators 120 and sensors 130 are arranged within range of the controller 120, 130. In some embodiments, actuators 120 and sensors 130 may be added to and removed from the system as the come into or leave a transmission range of the controller 110 respectively. The controller 110, actuators 120, and sensors 130 each define nodes of a single hop wireless network. Single-hop networks have lower latencies and overheads which may be beneficial in feedback control systems with low latency requirements.

The controller 110, actuators 120, and sensors 130 may be configured to communicate with each other using wireless radio technologies or standards such as Bluetooth®, ultra-wideband (UWB), and/or IEEE 802.15.4. Such technologies or standards are advantageously low-power but do not employ orthogonal frequency-division multiplexing (OFDM). Multiple radios communicating on different channels may therefore be required to reduce latencies below some minimum threshold.

In an example, the radios 112, 122, 132 may be configured to communicate on an IEEE 802.15.1 Bluetooth® PHY layer. The PHY layer comprises an enhanced data rate (EDR) feature which uses a combination of Gaussian Frequency Shift Keying (GFSK) and Phase Shift Keying (PSK) with π/4-Differential Quadrature Phase Shift Keying (DQPSK) and 8-Differential Phase Shift Keying (DPSK) variations. The EDR mode provides a nominal data rate of up to 2 Mbps using DQPSK modulation techniques and up to 3 Mbps using DPSK modulation techniques, reducing the duration of transmission timeslots and reducing the latency of the system.

The controller node 110 comprises two radios 112, one of which may be a primary radio. The controller node 110 comprising multiple radios advantageously allows the controller node 110 to simultaneously transmit or receive different packets to or from different actuators 120 and sensors 130 on different channels, allowing all of the actuators 120 and sensors 130 to communicate with the controller 110 within a shorter cycle time. For example, the system 100 may communicate on a plurality of channels of 1 MHz bandwidth each. It will be appreciated that the controller 110 may comprise three or more radios 112. The controller 110 may be an access point or base station. The controller may comprise or may be connected to a system programmable logic controller (PLC).

The one or more actuators 120 may each be any system, mechanism, or component thereof configured to regulate a process in response to instructions from the controller node 110; such actuators 120 may be mechanical or electronic. The actuators may each be a final control element. Each actuator comprises a single radio 122 configured to receive control packets including downlink instructions 125 from the control node 110, which are used to control said actuators 120.

The one or more sensors 130 may be any sensor configured to measure one or more process variables that are dependent upon one or more of the actuators. The process variables may be states or outputs of the system and may be mechanical or electronic. Each of the sensors comprises a single radio 132 configured to transmit feedback packets including uplink feedback 135 to the controller node 110.

The radios 122, 132 of the actuators 120 and sensors 130 are also configured to receive downlink scheduling related packets from the controller node 110. The actuators 120 and sensors 130 each only comprising a single radio 122, 132 reduces the complexity and cost of the system 100.

In the illustrated system 100 the actuators 120 and sensors 130 are all distinct devices. In alternative embodiments, some or all of the actuators and sensors may be comprised by slave devices comprising one of the one or more actuators and one of the one or more sensors. In such embodiments, one, some or all of the slave devices may comprise only a single radio which may be shared by its actuator and sensor. Each of the actuators 120, sensors 130, or slave devices may have unique identifiers (IDs), which may be assigned during an initialisation of the network.

A single closed-loop control system as described above may define a single cell of a larger multi-cell control system.

In use, the controller 110 receives uplink feedback 135 from each sensor 130 containing (or indicative of) measured values of the one or more process variables measured by that sensor 130. The controller 110 compares the values to desired set points or ranges of the values and then transmits downlink instructions 125 to the actuators 120 depending upon the comparisons. If one or more of the measured values differs from the desired set points or ranges, the downlink instructions 125 control one or more of the actuators to adjust the process in order to shift the measured variable to or towards the desired set point or range.

The controller 110 transmitting a downlink instructions 125 to each of the actuators 120 and receives uplink feedback 135 from each of the sensors 130 is referred to as a control cycle. Preferably, the downlink instructions 125 are transmitted and received before the uplink feedback 135 is transmitted. The time taken for a control cycle to be performed is a cycle time, which defines the latency of the system 100. In industrial applications, the cycle time must be kept below a minimum duration in order to ensure proper operation of the controlled process. This minimum duration depends on the process or processes controlled by the system and may be very low (on the order of 100 milliseconds) or ultra-low (on the order of 100 microseconds).

The controller 110, actuators 120 and sensors 130 are preferably time synchronised to enable them to communicate using a shared transmission schedule, for example using embodiments of methods for synchronising nodes as described herein.

Embodiments described herein relate to methods for transmitting downlink instructions 125 to one or more actuators 120 from a controller 110 and uplink feedback 135 from one or more sensors 130 to the controller 110 within a maximum cycle time and to methods for scheduling such transmissions.

It will be appreciated that the methods may be employed in a variety of different closed loop control systems, of which the system 100 shown in FIG. 1 is a single example. The systems may comprise different numbers of actuators 120, different numbers of sensors 130, and/or controller nodes 110 with different numbers of radios 112 compared to the example system 100 shown in FIG. 1. In some embodiments, the systems may be multi-hop systems rather than single hop systems. These different system parameters may influence or determine the scheduling of transmissions within a maximum cycle time.

Embodiments of methods for scheduling uplink and downlink transmissions 125, 135 for a control cycle comprise scheduling transmissions of downlink instructions 125 and uplink feedback 135 in specific timeslots on specific channels. Such methods may define a transmission schedule, or medium access control (MAC) slotframe, for one or more subsequent control cycles.

Scheduling uplink and downlink transmissions 125, 135 for a control cycle may comprise determining a cycle transmission structure for the control cycle. The cycle transmission structure may comprise one or more downlink time windows or timeslots for transmitting downlink instructions 125 for the actuators 120 of the scheduled system 100, one or more uplink time windows or timeslots for transmitting uplink feedback 135 from the sensors 130 of the scheduled system 100. The cycle transmission structure may further comprise one or more guard intervals, and a switching delay for controller radios 112. The cycle transmission structure may be determined by determining a number of downlink windows and a number of uplink windows, on which the entire cycle transmission structure may depend.

Figure 2:
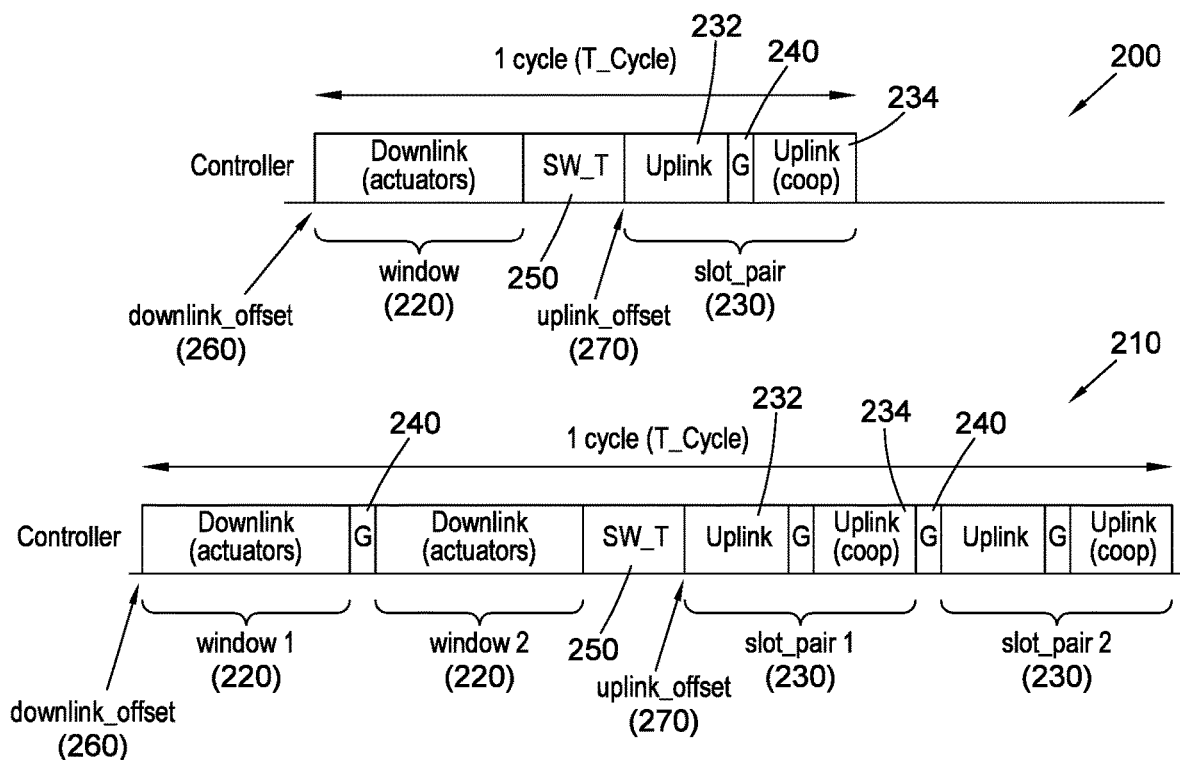
FIG. 2 shows two examples of transmission structures for control cycles of closed-loop control systems.

The cycle transmission structure may be determined for a maximum cycle time, which may depend on one or more processes controlled by the system. FIG. 2 shows two examples of cycle transmission structures 200, 210 determined for control cycles with different maximum cycle time durations.

In alternative embodiments (e.g. for scheduling transmissions in closed loop control systems with fixed cycle times, numbers of actuators and sensors, and payload sizes) the cycle time transmission structure may fixed rather than being determined.

The two example transmission structure 200, 210 are divided into different configurations of downlink windows 220, uplink timeslots 232, 234, guard intervals 240 and a switching delay 250.

In the illustrated transmission structures 200, 210, the one or more uplink timeslots 232, 234 are arranged in pairs referred to as uplink slot pairs 230. During each uplink slot pair 230, a sensor 130 may transmit its uplink feedback 135 during the first uplink timeslot 232 of the pair 230, and the sensor 130 and/or one or more nodes of the network 100 may retransmit the uplink feedback during the second uplink timeslot 234 of the pair 230. This may increase the reliability with which uplink feedback 135 is communicated to the controller 110 by using multiple transmissions, and/or by using other nodes to relay the uplink feedback 135 to the controller 110.

In some such embodiments, during the second paired timeslot 234, the uplink feedback 135 is cooperatively retransmitted by the sensor 130 and one or more other nodes (such as actuators 120) which act as relays. Each relaying node may receive uplink feedback 135 transmitted by a sensor 130 in the first paired timeslot 232 and retransmit it simultaneously with the sensor 130 in the second timeslot 234. The retransmissions may constructively interfere, thereby increasing the probability that it is received by the controller 110.

It will be appreciated that in other embodiments, some or all of the one or more uplink timeslots of the transmission structure 200, 210 may not be paired.

Scheduling uplink and downlink transmissions 125, 135 for a control cycle may further comprise scheduling individual actuators 120 and sensors 130 to transmit and/or to listen to receive within specific time intervals (downlink time windows 220, uplink timeslots 232, 234) of a defined or fixed cycle transmission structure on specific channels.

The cycle transmission structure 200, 210 may be defined, and/or actuators 120 and sensors 130 may be scheduled therein before one or more control cycles are performed using the determined schedule.

Determining the cycle transmission structure 200, 210 for a maximum cycle time may comprise determining a number of downlink windows 220 and a number of uplink timeslots 232, 234 for the cycle transmission structure 200, 210 to comprise.

The cycle transmission structure may be determined before any actuators 120 or sensors 130 are scheduled to transmit or receive therein, and the method may comprise subsequently scheduling the actuators 120 and sensors 130 to receive and transmit therein.

The number of downlink windows 220 and/or uplink timeslots 232, 234 (or pairs 230 thereof) may be determined based on the duration of the maximum cycle time, the number of actuators 120, the number of sensors 130, the number of radios 112 comprised by the controller 110, parameters of the physical layer of the radios 112, 122, 132 (such as header sizes and/or data transmission rates), MAC layer payload information (such as payload sizes for individual actuators 120 and/or sensors 130), the number of actuators 120 whose instructions can be aggregated in a single downlink packet, and/or other parameters.

For example, the number of uplink timeslots 232, 234 (or in embodiments in which uplink timeslots 232, 234 are paired, the number of uplink slot pairs 230) may be determined to be equal to or greater than the number or sensors 130 divided by the number of radios 112 of the controller 110. The number of downlink windows 220 may be determined to span a duration of the maximum cycle time such that the remainder of the maximum cycle time is long enough to fit such a number of uplink timeslots 232, 234 or uplink slot pairs 230 (plus any necessary switching delays 250 and guard intervals 240).

The number of downlink windows 220 may be determined to be equal to or greater than the number of actuators 120 divided by a maximum number of actuators 120 for which control instructions 125 can be aggregated together in a payload of a single physical layer data packet. The number of uplink timeslots 232, 234 (or in embodiments in which uplink timeslots 232, 234 are paired, the number of uplink slot pairs 230) may be determined to span a duration of the maximum cycle time such that the remainder of the maximum cycle time is able to fit such a number of downlink windows 220 (plus any necessary switching delays 250 and guard intervals 240).

The numbers of downlink windows 220 and uplink timeslots (or pairs 230 thereof) may be determined such that the total durations of the downlink windows 220, uplink timeslots 232, 234 a minimum switching delay 250 and a minimum number of necessary guard intervals 240 combined are less than or equal to the maximum cycle time.

The durations of the downlink time windows 220 and/or individual uplink timeslots 232, 234 may depend upon the data transmission rate of the physical layer with which they are transmitted, and the data size of the packets to transmitted therein. The size of the data packets to be transmitted in the downlink time windows 220 and the uplink timeslots 232, 234 may depend on physical layer parameters, such as header sizes, and upon the data size of downlink instructions 125 or uplink feedback 135 to be transmitted therein, which may be fixed. Such physical layer parameters and/or data sizes may be known and/or pre-set.

Figure 5:
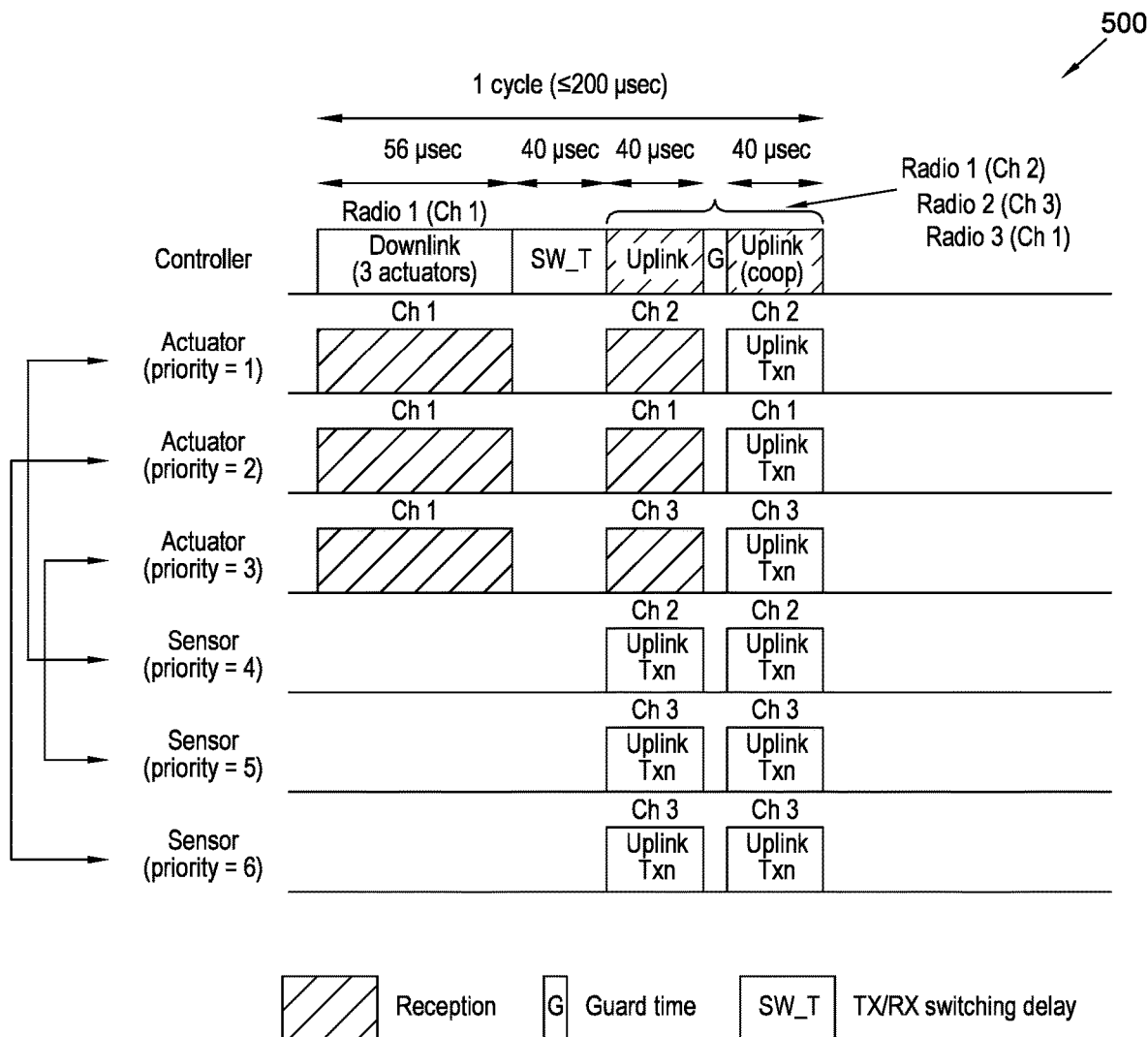
FIG. 5 shows an example of a transmission schedule for performing a control cycle with another system.

The downlink time windows 220 may be longer than the uplink timeslots 232, 234. For example, as shown in the example of FIG. 5, the downlink time windows may be 56 microseconds in duration and the uplink timeslots may be 40 microseconds in duration. This may enable downlink instructions 125 for multiple different actuators 120 to be aggregated together in the payload of a single control packet transmitted in a downlink time window 220. As the uplink feedback 135 is transmitted separately by each sensor 130, it is not possible to aggregate the uplink feedback 135 in the same manner as the downlink instructions 125.

The downlink time windows 220 are separated from the uplink timeslots 232, 234 by a switching delay 250 which allows for the radios 112 of the controller 110 to switch between a receive mode and a transmit mode and optionally to switch channel. In the illustrated example cycle times 200, 210, the downlink time windows 220 are arranged before the uplink timeslots 232, 234 (and consequently before the switching interval 250). This may advantageously allow the controller 110 to receive uplink feedback 235 indicative of the effect on a process of transmitted downlink instructions 125 within a single control cycle; for example for each of the sensors 130 that monitors a process regulated by one or more of the actuators 120.

In the illustrated cycle transmission structures 200, 210, the uplink timeslots 232, 234 are arranged in pairs 230. Each uplink slot pair 230 comprises first and second paired timeslots 232, 234 separated by a guard interval 240. In transmission schedules determined using such cycle transmission structures 220, 210, individual sensors 130 are each scheduled to transmit their uplink feedback 135 in specific uplink slot pairs 230. The first paired timeslot 232 of each uplink slot pair 230 is for the assigned sensor 130 to transmit a feedback packet including its uplink feedback 135 to the controller 110. The second paired timeslot 234 is for that sensor 130 and/or one or more other nodes to retransmit the feedback packet. In some embodiments the sensor 130 and the one or more other nodes may both cooperatively retransmit the feedback packet substantially simultaneously, such that their transmissions constructively interfere, increasing the probability that the feedback packet is successfully received by the controller 110. Any such one or more other nodes may have listened for and overheard the feedback message 135 during the first paired timeslot 232. In the example embodiments described herein, the one or more other nodes are one or more actuators 120 paired with the sensor 130. The radios 122 of these actuators 120 would not otherwise need to be active after the receipt of their actuators' 120 downlink instructions 125 to perform the control cycle.

In embodiments in which uplink timeslots 232, 234, each pair of timeslots 232, 234 is separated by a guard interval 240. In embodiment in which uplink feedback 135 is overheard by one or more relaying node in the first paired timeslot 232 and retransmitted by that relaying node in the second paired timeslot 234 (optionally cooperatively with the uplink feedback 135 originating sensor), the guard intervals 240 between the first and second paired timeslots 232, 234 may be sufficiently long for the radio of the one or more relaying nodes to switch from receive to transmit. In other embodiments, the guard interval may be shorter.

Alternatively, or additionally, the cycle transmission structure 200 and transmission schedule may use other forms of cooperative transmissions, possibly including those based on network coding. Such other forms of cooperative transmissions may not require or use paired uplink time slots.

It will be appreciated that in some embodiments, cycle transmission structures 200, 210 may comprise one or more unpaired uplink timeslots 232, 234 instead of (or in addition to) one or more uplink slot pairs 230.

In cycle times comprising multiple downlink time windows 220 and/or multiple uplink timeslots 232, 234 or pairs 230 thereof, such as the longer example cycle time 210 shown in FIG. 2 the multiple downlink time windows 220, uplink timeslots 232, 234, and uplink slot pairs 230 are also preferably separated from each other by guard intervals 240. Some or all of these guard intervals 240 (such as all of the guard intervals 240 except those between paired uplink timeslots 232, 234) may be shorter than the switching interval 250.

The start time of the earliest of the one or more downlink windows 220 within the cycle transmission structure 200, 210 is defined as the downlink offset 260. The start time of the earliest of the one or more uplink timeslots 232 (and by extension of the earliest of the one or more slot pairs 230) is defined as the uplink offset 270.

Embodiments of methods for scheduling downlink transmissions 125 from a controller 110 to one or more actuators 120 and uplink transmissions 135 from one or more sensors 130 to the controller 110 comprise allocating each of the one or more actuators 120 to a downlink window 220 of a determined or fixed cycle transmission structure on a specific channel and allocating each of the sensors 130 to an uplink timeslot 232, 234 (or pair 230 thereof) of the cycle transmission structure on a specific channel to build a transmission schedule.

Each actuator 120 allocated to a downlink time window 220 on a specific channel is preferably scheduled to listen to receive a respective downlink instructions packet in that downlink time window 220 on that channel, and one of the controller radios 112 is scheduled to transmit the downlink instructions packet in that downlink time window 220 on that channel.

Each sensor 130 that is allocated to a uplink timeslot 232, 234 (or a pair 230 thereof) is preferably scheduled to transmit a respective uplink feedback packet in that uplink timeslot (or in both timeslots 232, 234 of that pair 230 of timeslots 232, 234) on that channel, and one of the controller radios 112 is scheduled to listen to receive the uplink feedback packet in that uplink timeslot 232, 234 (or in both timeslots 232, 234 of that pair 230 of timeslots 232, 234).

In some embodiments, the scheduling of downlink transmissions 125 and uplink transmissions 135 may comprise additional steps, such as pairing some or all of the one or more sensors 130 with one or more other nodes and/or determining one or more groups of actuators to aggregate downlink instructions to. The one or more actuators 120 and sensors 130 are preferably allocated to specific time intervals on specific channels such that none of the transmissions conflict with each other.

In some embodiments, the downlink transmissions 125 and uplink transmissions 135 may be scheduled in a decentralised manner using transmissions between the controller 110 and the actuators 120 and sensors 130. In other embodiments, the downlink transmissions 125 and uplink transmissions 135 may be scheduled by a single device, such as the controller, in a centralised manner and communicated to all nodes of the system 100.

In some embodiments, the transmission schedule may be built in a decentralized manner using a plurality of signalling transmissions between the controller 110 and the actuators 120 and sensors 130. The plurality of signalling transmissions may be performed in a signalling slotframe which may precede the one or more scheduled transmissions and may comprise a plurality of signalling timeslots during which different nodes may transmit signalling packets. The signalling transmissions may be performed on a dedicated signalling channel $w_s$.

Figure 3:
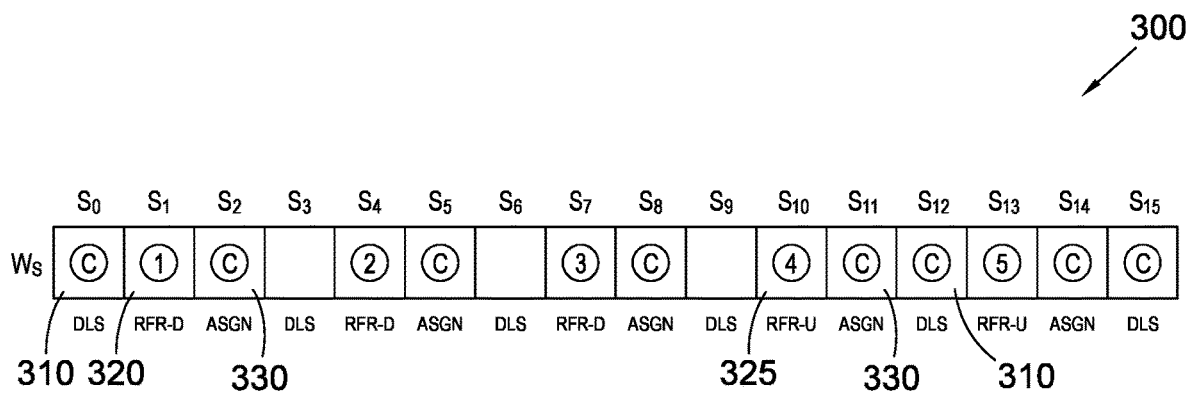
FIG. 3 shows a schedule of signalling transmissions during an example of a signalling slotframe for building a transmission schedule for a transmission cycle of a closed-loop control system.

FIG. 3 shows a schedule of signalling transmissions during an example of such a signalling slotframe 300 for building a transmission schedule for one or more subsequent transmission cycles of the system 100 of FIG. 1. The illustrated signalling slotframe 300 comprises sixteen signalling timeslots $s_0$ to $s_{15}$ and shows which nodes transmit signalling packets during them on a dedicated signalling channel $w_s$.

The signalling timeslots of a signalling slotframe 300 may be divided into three types: downlink-signalling (DLS) timeslots 310, request-for-resources (RFR) timeslots 320, 325, and assignment (ASGN) timeslots 330. Such signalling timeslots may be arranged in a repeating pattern, starting with a DLS timeslot 310, with each DLS timeslot 310 being followed by an RFR timeslot 320, 325, each RFR timeslot 320, 325 being followed by an ASGN timeslot 330 and each ASGN timeslot 330 being followed by another DLS timeslot 310, until the slotframe 300 is complete.

Each individual RFR timeslot 320, 325 and immediately subsequent ASGN timeslot 330 may be used to allocate one actuator 120 or sensor 130 to receive or transmit in a specific downlink window 220 or uplink timeslot 232, 234 or pair 230 thereof and to communicate the allocation to that actuator 120 or sensor 130.

Therefore, the total number of signalling timeslots may be at least equal to triple the total number of actuators 120 and sensors 130, so as to provide a sequence of a RFR timeslot 320, 325, a subsequent ASGN timeslot 330 and a subsequent DLS timeslot 310 for each of the actuators 120 and sensors 130. The number of signalling timeslots may be equal to at least three times the total number of actuators 120 and sensors 130 plus one to plus one, to provide an additional initial DLS timeslot for a controller to assign priorities to the actuators 120 and sensors 130. These priorities may set the order in which they request resources in the signalling slotframe 300. In some embodiments, the signalling slotframe 300 may comprise more than this many signalling timeslots, for example to allow retransmissions in the event that messages transmitted in one or more of the signalling timeslots are not successfully received.

The example signalling slotframe 300 shown in FIG. 3 comprises sixteen signalling timeslots 310, 320, 325, 330; one RFR timeslot 320, 325, one ASGN timeslot 330 and one DLS timeslot 310 for each actuator 120 and sensor 130, plus an initial DLS timeslot 310 for assigning priorities to the actuators and sensors 120, 130.

The downlink-signalling (DLS) timeslots 310 may be allocated to the controller 110 to transmit scheduling-related information, which may be intended for and/or received by one, some, or all of the actuators 120 and the sensors 130. During each of the DLS timeslots 310, all of the actuators 120 and sensors 130 may listen to receive transmissions from the controller 110. The controller 110 may transmit in only a subset of the DLS timeslots 310.

In the first DLS timeslot 310, so, the controller 110 may transmit an initial DLS message assigning a priority to each of the actuators 120 and the sensors 130. The priority may determine the order in which the actuators 120 and sensors 130 request and are assigned resources during the signalling slotframe 300.

The controller 110 preferably assigns the actuators 120 earlier priorities than the sensors 130, such that actuators 120 are scheduled before the sensors 130. This may be performed because the downlink windows 220 to which the actuators 120 are assigned occur before the uplink slot pairs 230 in the cycle transmission structure 200, 210. In the example signalling slotframe 300 illustrated in FIG. 3, the three actuators 120 are assigned priorities one, two and three, and the sensors are assigned priorities four and five. In some embodiments, the priorities assigned to the actuators 120 and sensors 130 may depend upon their IDs, traffic, or other parameters.

Each of the RFR timeslots 320, 325 may be allocated to one of the actuators 120 and sensors 130, in order of their priorities, for that actuator 120 or sensor 130 to request resources from the controller 110. During the RFR timeslot 320, 325, the allocated actuator 120 or sensor 130 may be configured to transmit a request for resources message to the controller 110 and the controller 110 may be configured to listen to receive the message.

The requested resources may be resources with which to transmit or listen for a message in the cycle transmission structure 200, 210 and may comprise a time interval (either a downlink time window 220 or an uplink timeslot 232, 234 or pair 230 thereof) to transmit or receive in, and preferably a channel to transmit on and/or radio of the controller 110 to transmit to. Each actuator 120 or sensor 130 requesting resources preferably does not request specific resources and instead requests that the controller 110 determine resources to allocate to that actuator 120 or sensor 130.

Actuators 120 preferably request resources for receiving downlink instructions 125 from the controller 110, for which the time interval is a downlink time window 220, which may be specified using a downlink time window identifier and a downlink offset giving the start time of the first of one or more downlink windows within the transmission cycle. The request for resources timeslots 320 allocated to the actuators 120 are referred to as request-for-resources-downlink (RFR-D) timeslots 320.

Sensors 130 request resources for transmitting uplink feedback 135 to the controller, for which the time interval is an uplink timeslot 232, 234 or pair 230 thereof, which may be specified using an uplink timeslot identifier or uplink slot pair identifier and an uplink offset giving the start time of the first of one or more uplink timeslots within the transmission cycle. The request for resources timeslots 325 allocated to the sensors 130 are referred to as request-for-resources-uplink (RFR-U) timeslots 325.

Actuators 120 and sensors 130 requesting resources as described above may advantageously increase the flexibility with which nodes are scheduled in dynamically changing networks 100 and/or environments.

In some embodiments, one, some, or all of the actuators 120 and/or sensors 130 may not request resources for receiving downlink instructions 125 and/or transmitting uplink feedback 135; for example, during scheduling of one or more control cycles that they have determined that they do not need to participate in. Such actuators 120 and/or sensors 130 may each instead transmit a message indicating that they do not require resources in the RFR timeslot 320, 325 allocated to them; the controller 110 may transmit an acknowledging message in the subsequent ASGN timeslot 330.

Each of the actuators 120 and sensors 130 may determine the RFR timeslot corresponding to its assigned priority in the initial DLS message 310. For example, the initial DLS message 310 may specify an index of the next available RFR timeslot (i_RFR_slot) and each actuator 120 and sensor 130 may compute the index of the RFR slot in which it is to request resources as i_RFR_slot+Priority−1. The index of an RFR timeslot is its position in the sequence of RFR timeslots comprised by the signalling slotframe 300.

Each of the ASGN timeslots 330 may be allocated to the controller 110 to respond to the request for resources in the immediately preceding RFR timeslot 320, 325 by transmitting an resource assignment message to the actuator 120 or sensor 130 that transmitted a request for resources in that RFR timeslot 320, 325. During each ASGN timeslot 330, the actuator 120 or sensor 130 that transmitted in the immediately preceding RFR timeslot 320, 325 may listen to receive the assignment message.

The nodes that transmit in each signalling timeslot of the signalling slotframe 300 illustrated in FIG. 3 are denoted by their assigned priorities, with the controller 110 being denoted by a "C". As described above, the controller 110 transmits the initial DLS message in the first DLS timeslot 310, so. The first, second and third actuators 120 request resources in the second, fifth and eighth timeslots $s_1$, $s_4$, $s_7$ (the first, second and third RFR timeslots 320) respectively and are assigned resources by the controller 110 in the third, sixth and ninth timeslots $s_2$, $s_5$, $s_8$ (the first, second and third ASGN timeslots 320) respectively. The first and second sensors 130 request resources in the eleventh and fourteenth timeslots $s_{10}$, $s_{14}$ (the fourth and fifth RFR timeslots 325) respectively and are assigned resources by the controller 110 in the twelfth and fifteenth timeslots $s_{11}$, $s_{14}$ (the fourth and fifth ASGN timeslots 330) respectively. Additionally, the controller transmits DLS messages with pairing information in the thirteenth and sixteenth timeslots $s_{12}$, $s_{15}$, (the DLS timeslots 310 following the assignment of resources to the sensors 130).

In some embodiments, all of the sensors 130 and actuators 120 and the controller may listen to receive packets in the signalling timeslots 310, 320, 325, 330 in which they do not transmit and/or are not scheduled to transmit.

Upon receiving a request for resources message from an actuator 120 or sensor 130, the controller 110 may assign resources to that actuator 120 or sensor 130 to listen for downlink instructions 125 or transmit uplink feedback 134. The controller may then transmit an assignment message specifying the assigned resources to the actuator 120 or sensor in the subsequent ASGN timeslot 330, during which the resource-requesting actuator 120 or sensor 130 may listen to receive the assignment message.

Embodiments as described above in which the downlink and uplink transmissions 125, 135 are scheduled in a decentralized manner during a signalling slotframe 300 by the actuators 120 and sensors 130 requesting resources from a controller may advantageously enable actuators 120 and/or sensors 130 to only be scheduled for control cycles in which they request resources. This enables the actuators 120 and sensors 130 that participate to be varied between different control cycles scheduled in different signalling slotframes 300.

The embodiments described above with reference to FIG. 3 may be used to schedule downlink and uplink transmissions 125, 135 for single-hop closed-loop control systems. In other embodiments, downlink and uplink transmissions 125, 135 may be scheduled for multi-hop closed-loop control systems. In such embodiments, actuators 120 and sensor 130 may request resources from, and be assigned resources by, their parent nodes, preferably in RFR and ASGN timeslots 320, 325, 330. Some such embodiments may use some or all of the features of a GALLOP closed loop mesh topology control scheduling method described in U.S. Pat. No. 10,349,427 B2.

In alternative embodiments, the downlink and uplink transmissions 125, 135 may be scheduled in a centralized manner by a single device, such as by the controller 110. In such embodiments, the controller 110 may determine resources to allocate to each of the actuators 120 and sensors 130 and may broadcast or otherwise transmit the determined transmission schedule to all of the actuators 120 and sensors 130 of the system.

The controller 110 may determine resources to allocate to each of the actuators 120 and sensors 130 in the same manner in decentralized and centralized scheduling methods. In each case, the controller 110 may determine resources to allocate to each of the actuators 120 and sensors 130 sequentially, for example in order of priories assigned by the controller 110.

As described above, the assigned resources for transmitting or listening for messages may comprise a time interval (either a downlink time window 220, an individual uplink timeslot 232, 234, or an uplink slot pair 230) and preferably further comprise a channel to transmit or listen on, and/or a controller radio 112 to transmit to or listen to receive from.

The controller 110 preferably determines resources to allocate to each actuator 120 or sensor 130 that minimize the number scheduled time intervals (the number of scheduled downlink time windows 220 and/or uplink slot pairs 230) without conflicts and/or minimizes number of active channels and/or radios 112 of the controller 110.

In embodiments in which the resources assigned to each actuator 120 and sensor 130 comprise a channel and/or controller radio 112 as described above, the controller 110 preferably only assigns an actuator 120 or sensor 130 a channel and/or a controller radio 112 that has not been assigned to one or more other actuators 120 or sensors 130 if it is not possible to assign it a channel and/or controller radio that has already been assigned to another actuator 120 or sensor 130. For example, when determining resources to assign to a first actuator 120 or sensor 130, or when determining resources to assign to an actuator 120 or sensor 130 after all time intervals with respect to previously assigned channels and/or controller radios 112 have already been assigned in their entirety.

In some embodiments, the controller may assign different channels to sensors 130 that it assigns to actuators 120. This may thereby define distinct, preferably non-overlapping downlink channels for transmitting downlink instructions 125 to the actuators and uplink channels for transmitting uplink instructions 135 from the sensors 130. Such downlink and uplink channels may be distinct from, and may not overlap with, a signalling channel on which the signalling transmissions are made.

In some embodiments, the time interval assigned to an actuator 120 or sensor 130 may be the earliest available suitable time interval (i.e. earliest suitable downlink window 220 for an actuator, or the earliest suitable uplink slot pair for a sensor 130, that would not cause a conflict).

In some embodiments, multiple actuators 120 may be assigned the same downlink time window 220 on the same channel and/or to the same controller radio 112. In such embodiments, the controller 110 is preferably configured to aggregate the downlink instructions 125 to the multiple actuators 120 into a single downlink packet to be transmitted in that downlink time window 220. In such embodiments, the controller 110 may continue to assign the same downlink window to resource-requesting actuators 120 until a maximum number of actuators 120 have been assigned the downlink window 220. Such a maximum number may depend upon the duration of the downlink window 220, the data size of downlink instructions 125 for a single actuator 120 and the data transmission rate.

For example, when determining resources to assign to actuator 120, the controller 110 may determine a downlink time window 220 and a channel and/or controller radio 112 to assign to that actuator 120. If less than a maximum number of actuators 120 have been assigned to any one downlink window 220 and a given channel and/or controller radio 112, the controller may assign the actuator 120 to that downlink window 220 and that channel and/or controller radio 112. If not, and a subset of a plurality of downlink windows 220 on a single channel and/or from a single controller radio 112 have been assigned to actuators 120, the controller 110 may assign an unused downlink window 220 on that channel and/or from that controller radio 112 to the actuator 120 (such as the earliest such downlink window 220). Otherwise, the controller 110 may assign the earliest downlink window 220 on an unused channel and/or from an unused controller radio 112 to the actuator 120.

When determining resources to assign to a sensor 130, the controller 110 may determine an uplink timeslot 232, 234 or slot pair 230 and a channel and/or controller radio 112 to assign to that sensor 130. If a subset of a plurality of uplink timeslots 232, 234 or slot pairs 230 on a single channel and/or to a single controller radio 112 have been assigned to sensors 130, the controller 110 may assign an unused uplink timeslot 232, 234 or slot pair 230 on that channel and/or from that controller radio 112 to the sensor 130 (such as the earliest such uplink timeslot 232, 234 or slot pair 230). Otherwise, the controller 110 may assign the earliest uplink timeslot 232, 234 or slot pair 230 on an unused channel or from an unused controller radio 112 to the sensor 130.

In addition to assigning resources to each sensor 130, the controller 110 may also determine one or more actuators 120 to pair with the resource-requesting sensor 130. In decentralized scheduling methods, after determining which one or more actuators 120 to pair with the resource-requesting sensor 130, the controller 110 may transmit a downlink scheduling message specifying the pairing in the DLS timeslot 310 following the ASGN timeslot 330 in which it transmits a message assigning resources to the resource-requesting sensor 130. The downlink scheduling message specifying the pairing may be listened for and/or received by all of the actuators (and/optionally by the resource-requesting sensor 130 and/or all of the sensors 130). Some or all of the sensors 130 may have one or more actuators 120 paired with them in this manner.

In embodiments in which some or all of the actuators 120 and sensors 130 are comprised by slave devices comprising an actuator 120 and a sensor 130 and a single shared radio, the controller 110 may instead pair one, some, or each of the sensors 130 with another slave device whose sensor 130 is not allocated to the same uplink slot pair 230.

In the one or more control cycles for which the uplink and downlink transmissions 125, 135 are scheduled the one or more actuators 120 paired with each sensor 130 may listen to receive an uplink feedback message transmitted by that sensor 130 in the first timeslot 232 of an uplink slot pair 230 assigned to that sensor 130. Then in the second timeslot 234 of the uplink slot pair 230, the sensor 130 and the one or more actuators 120 paired with it may retransmit the uplink feedback message substantially simultaneously. These retransmissions may constructively interfere, increasing the probability that the uplink feedback message is successfully received by the controller 110.

The sensor 130 may preferentially pair some or all of the sensors 130 with one or more actuators 120 (or slave devices) with which it has relatively strong network links. Which of the actuators 120 (or slave device) of the system 100 to pair with a sensor 130 may be determined based on one or more metrics of the network link between the sensor 130 and some or all of the actuators 120, such as a signal to noise ratio (SNR) of such a network link. Some or all of the actuators 120 and/or sensors 130 may passively listen for transmissions by neighbouring nodes in order to determine such metrics. For example, one, some, or all of the sensors 130 may passively listen for the RFR messages transmitted by each of the actuators in the RFR-D timeslots 320 and measure the SNR of each of the RFR messages it receives. A sensor 130 may transmit said link metrics (such as SNR values), or any metric (such as a ranking) derived therefrom, in its RFR message transmitted in its allocated RFR-U timeslot. This may allow the controller 110 to pair the sensor 130 with an actuator with which it shares a relatively strong network link, and which is therefore likely to receive the uplink feedback message transmitted in the first timeslot 232 of the uplink slot pair 230.

In some embodiments, the pairing-specifying downlink scheduling message 310 may specify some or all of resources assigned to the sensor 130 in the immediately preceding ASGN timeslot 330, so as to inform the one or more paired actuators 120 of the uplink slot pair, channel, and/or controller radio with which to listen and retransmit. Alternatively, or additionally, the actuators 120 of the system may all listen in all of the ASGN timeslots 330 in order to learn which resources are assigned to sensors 130 in case they are paired with them in the subsequent DLS timeslot 310.

In some embodiments of decentralized scheduling methods, during the scheduling of the uplink and downlink transmissions 125, some or all of the signalling transmissions transmitted during the signalling slotframe 300 may not be successfully received. This may necessitate retransmitting such messages to complete the scheduling.

Some embodiments of decentralized scheduling methods may perform retransmissions if one or more of the signalling transmissions is not successfully received. In some such embodiments, the controller 110 may transmit a group acknowledgement (G-ACK) message after the timeslots allocated to the actuators 120 and sensors 130. For example, after the DLS timeslot 310 immediately following the ASGN timeslot 330 immediately following the RFR-U timeslot 325 allocated to the latest priority sensor 130. Such a G-ACK message may specify which of the actuators 120 and/or sensors 130 the controller 110 did not successfully receive a RFR message from in the signalling slotframe 300 (and which are to retransmit their RFR messages). In a first scenario, the controller 110 may have failed to receive a node's RFR message due to an uplink failure from that node resulting in the controller 110 failing to receive its transmitted RFR message. In a second scenario, the controller 110 may have failed to receive a node's RFR message due to a downlink failure to it resulting in the node not receiving the initial priority-specifying DLS message and consequently not transmitting an RFR message in their allocated RFR timeslot 320, 325. In some embodiments, the G-ACK message may specify the order in, or priority with which the specified actuators 120 and/or sensors 130 are to retransmit their RFR messages.

Each of the one or more actuators 120 and/or sensors 130 specified in the G-ACK message may each transmit a copy of their RFR messages in one or more subsequent timeslots, which may depend upon an order or priority assigned to them in the G-ACK message. In some or all these timeslots, each of the one or more specified actuator 120 or sensor 130 may simultaneously transmit a copy of their RFR message with one or more other nodes. Such other nodes may have overheard the original transmission of their RFR message that the controller failed to receive, or overheard an earlier retransmission in embodiments in which the RFR message is retransmitted multiple times.

If an uplink link from a node 120, 130 failed in the first scenario described above, one or more neighbouring nodes 120, 130 may have overheard the RFR message that was transmitted by that node but was not received by the controller 110. Such a neighbouring node can act as a relay to transmit the RFR message, preferably simultaneously with the node 120, 130 whose uplink link failed. Alternatively, such a neighbouring node can transmit a network-coded message derived from the RFR message. In some embodiments, one of a plurality of such neighbouring may be selected based on a respective priority for performing such a transmission, for example based on the signal to noise ratio of their network link to the node 120, 130 whose uplink link to the controller failed.

If a downlink link to a node 120, 130 failed in the second scenario described above, the node 120, 130 may also fail to receive the G-ACK message. If the controller 110 does not receive a the RFR message from the node within a timeout period following the transmission of the G-ACK message, the controller 110 may transmit a downlink message requesting the node's RFR message using a neighbouring node as a relay to transmit the RFR-message-requesting downlink message to the node 120, 130 whose uplink link failed, preferably simultaneously with the controller 110. In some embodiments, one of a plurality of such neighbouring may be selected based on a respective priority for performing such a transmission, for example based on the signal to noise ratio of their network link to the node 120, 130 whose downlink link from the controller failed.

In some such embodiments, retransmissions may use some or all of the features of retransmissions of a GALLOP closed loop mesh topology control scheduling method or ENCLOSE closed loop star topology control scheduling method described in U.S. Pat. No. 10,349,427 B2.

Figure 4:
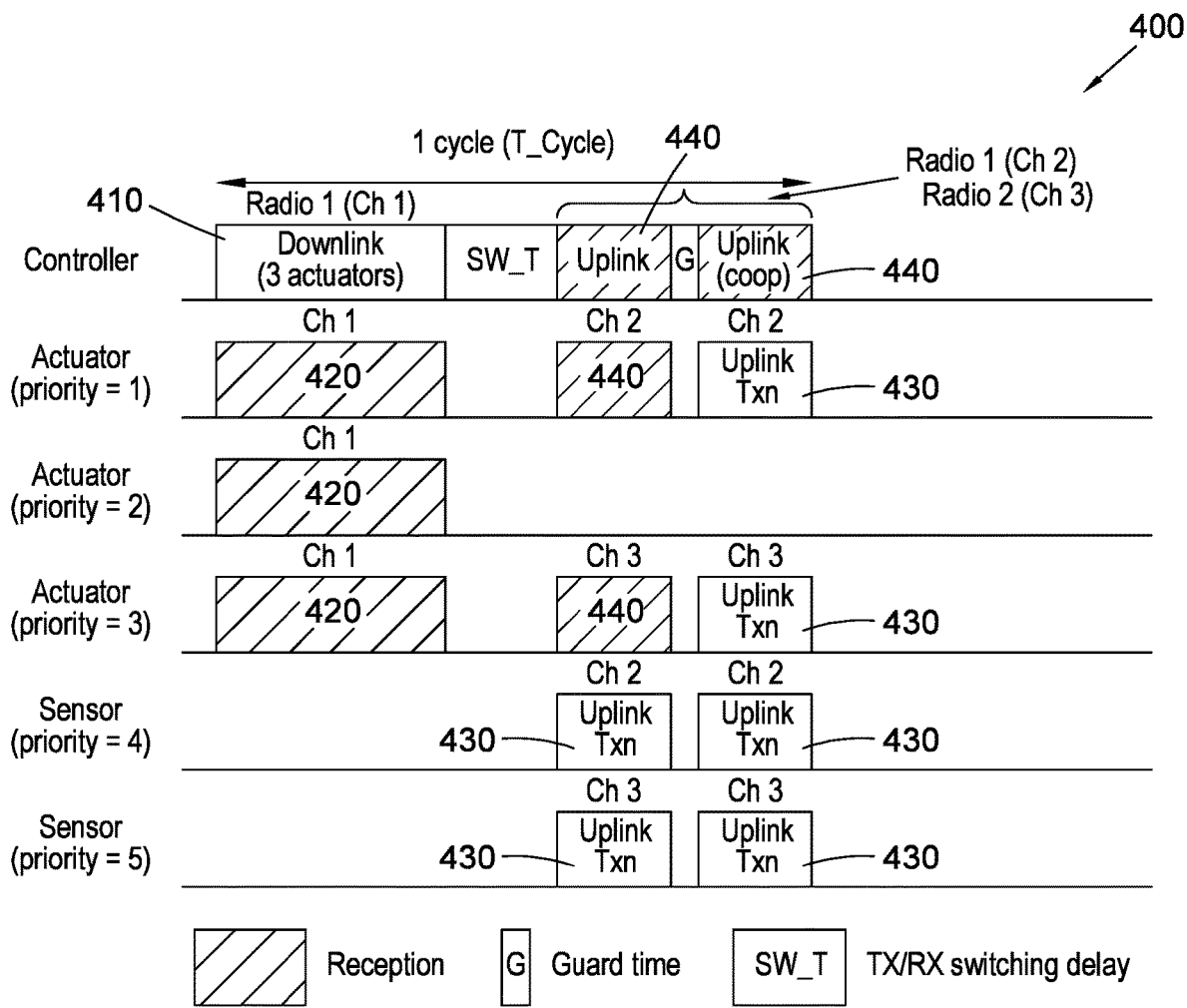
FIG. 4 shows an example of a transmission schedule for performing a control cycle with the example system of FIG. 1 using a cycle transmission structure 20 as shown in FIG. 2a scheduled using a signalling slotframe as shown in FIG. 3.

FIG. 4 shows an example of a transmission schedule 400 for performing a control cycle 400 with the example system 100 of FIG. 1 using a cycle transmission structure 200 comprising a single downlink window 210 and a single uplink slot pair 230 as shown in FIG. 2a.

As described above, the example system 100 comprises three actuators 120, two sensors 130 and a controller 110 with two radios 112. The two controller radios 112 enable the controller 110 to transmit and receive two different messages on two different channels simultaneously.

The system has a maximum cycle time within which downlink instructions of a given data size must be transmitted to each of the three actuators 120 from the controller and uplink feedback of a given data size must be transmitted from each of the sensors 130 to the controller 110. The radios communicate via a wireless physical layer with given properties (such as a data rate and header sizes) which limit the amount of data that can be transmitted in any given time and the possible transmission structure 200 with which a control cycle 400 may be performed.

In order to build the transmission schedule 400, the controller 110 determines cycle transmission structure 200 and schedules the actuators 120 and sensors 130 to transmit and receive in specific time intervals thereof, on specific channels, to and from specific radios 112 of the controller 110.

The cycle transmission structure 200 is based on a maximum cycle time, the numbers of actuators 120 and sensors 130 and durations of downlink windows 220 and uplink slot pairs 230. The durations of downlink windows 220 and uplink slot pairs 230 are themselves based on the data transmission rate, the data sizes of downlink instructions 125 and uplink feedback 135 to be transmitted, the number of actuators 120 whose instructions can be aggregated in a single downlink packet, and the data size of other packet elements (such as headers).

In the illustrated example, the system 100 is configured to use downlink windows 220 that are long enough to transmit downlink packets containing aggregated instructions for up to three different actuators 120. The controller therefore determines or knows that it requires a minimum of one downlink interval to transmit downlink instructions to the three actuators 120 (as one downlink window would allow instructions for up to six actuators to be transmitted by using both radios 112).

As the system 100 comprises two sensors 130 and the controller radio comprises two radios 112, the controller 110 determines or knows that it requires a minimum of one uplink slot pair to receive uplink instructions from both sensors 130 (as each sensor 130 can transmit on a different channel to a different controller radio 112 therein).

In the illustrated example, the maximum cycle time is too short to contain a switching interval 250 and a total of three or more of either downlink windows 220 or uplink slot pairs 230. The controller 110 therefore determines that the cycle transmission structure 200 can contain a maximum of two of either downlink windows 220 or uplink slot pairs 230. The controller 110 therefore determines that the cycle transmission structure 200 must contain one downlink window 220 and one uplink slot pair 230.

The controller 110 schedules the actuators 120 and sensors 130 to transmit and receive in specific time intervals of the determined transmissions structure 200, on specific channels, to and from specific radios 112 of the controller 110 in order to build the transmission schedule 400. The transmission schedule 400 is built by the controller 110 assigning priorities to each of the actuators 120 and sensors 130 and sequentially assigning each of them a time interval, channel and controller radio 112 in the order of their priorities.

The controller 110 assigns the three actuators 120 the earlier priorities 1, 2 and 3 and the two sensors 130 the two later priorities 4 and 5.

The controller 110 assigns the first of the actuators 120 to listen to receive downlink instructions 125 in the downlink window 220 on a first channel (Ch 1) from a first of the controller radios 112 (Radio 1). As downlink instructions 125 for up to three actuators 120 can be aggregated in a single downlink packet transmitted in a single downlink window 220, the controller 110 also assigns the second and third of the actuators 120 to listen to receive downlink instructions 125 in the downlink window 220 on Ch 1 from Radio 1.

If the system 100 further comprised a fourth, fifth and/or sixth actuator, the controller 110 would assign it to listen to receive downlink instructions 125 in the downlink window on another channel from the second of the controller radios 112 (Radio 2).

The controller assigns the first of the sensors 130 (which has priority 4) to transmit uplink feedback 135 in the uplink slot pair 230 on a second channel (Ch 2) to the first of the controller radios 112 (Radio 1). The controller then assigns the second of the sensors 130 (which has priority 5) to transmit uplink feedback 135 in the uplink slot pair 230 on a third channel (Ch 3) to the second of the controller radios 112 (Radio 2). The sensors 130 transmit a copy of a packet containing their uplink feedback 135 in each of the timeslots 232, 234 of the uplink slot pair 230 to which they are assigned.

As described above, the actuators 120 are assigned to listen to receive downlink instructions 125 on Ch 1, while the sensors 130 are assigned to transmit uplink feedback 135 on different channels, Ch 2 and Ch 3. Ch 1 is therefore a downlink channel for the control cycle and Ch 2 and Ch 3 are uplink channels for the control cycle.

In addition to scheduling the actuators 120 and sensors 130 to receive and transmit, the controller 110 pairs each of the sensors 130 with one of the actuators 120 to cooperatively retransmit the uplink feedback 135 of that sensor 130.

In some embodiments, the transmission schedule 400 may be scheduled in a decentralized manner using a plurality of signalling transmissions between the controller 110 and the actuators 120 and sensors 130 during a signalling slotframe 300 comprising a plurality of signalling timeslots 310, 320, 330 on a dedicated signalling channel $w_s$ as described above with reference to FIG. 3.

In a first DLS timeslot 310, the controller 110 may transmit a DLS message that is listened for and received by all of the actuators 120 and sensors 130, assigning the determined priorities to the actuators 120 and sensors 130.

The actuators 120 and sensors 130 may then sequentially request resources in the RFR timeslots 320, 325 of signalling slotframe 300 in order of their assigned priorities and the controller 110 may sequentially assign resources to them and transmit said assigned resources in the ASGN timeslots 330 following each of the RFR timeslots 320, 325.

After each of the sensors 130 is assigned resources in a respective ASGN timeslot 230, the controller may transmit a packet specifying which actuator is paired with that sensor 130 in the DLS timeslot 310 immediately following that ASGN timeslot 320.

In alternative embodiments, the transmission schedule 400 may be built centrally by the controller 110 and broadcast to each of the actuators 120 and sensors 130.

The actuator 120 paired with each sensor 130 is scheduled to listen to receive an uplink feedback message transmitted by that sensor 130 in the first timeslot 232 of the uplink slot pair 230 assigned to that sensor 130 on the same channel as is assigned to that sensor 130. The paired actuator 120 is further scheduled to transmit a copy of the uplink feedback message received in the first timeslot 232 in the second timeslot 234 of the uplink slot pair 230 on the same channel as is assigned to that sensor 130 to the same controller radios 112 to which the sensor 130 transmits. This retransmission may constructively interfere with the second transmission by the sensor 130 with which the actuator 120 is paired, increasing the probability that the uplink feedback message is successfully received by the controller 110.

FIG. 4 shows the scheduled actions of each of the controller 110, the actuators 120 and the sensors 130 during each part of the transmission structure 200 in the determined transmission schedule 400.

In the downlink window 220 at the start of the transmission structure 200, the controller 110 transmits 410 a downlink packet comprising aggregated downlink instructions 125 for all three of the actuators 120 on Channel 1 using Radio 1 and the three actuators 120 listen 420 to receive it. The downlink window 220 is followed by a switching interval 250 in which the radios 112 of the controller switch to transmit and Radio 1 switches to Channel 2 and Radio 2 switches to Channel 3.

After the switching interval 250, in a first timeslot 232 of the uplink slot pair 230, the two sensors 130 transmit 420 respective uplink packets comprising uplink feedback 135 from the respective sensors 130. The first of the sensors 130 transmits 420 its respective uplink packet on Channel 2 and the second of the sensors 130 transmits 420 its respective uplink packet on Channel 3. In the first timeslot 232, the controller 110 listens 440 to receive the uplink packets using Radio 1 on Channel 2 and Radio 2 on Channel 3. Additionally, the first actuator 120, which is paired with the first sensor 130, listens 440 to receive uplink packet transmitted by the first sensor on Channel 2 and the third actuator 120, which is paired with the second sensor 130, listens 440 to receive uplink packet transmitted by the second sensor on Channel 3.

The first timeslot 232 of the uplink slot pair 230 is separated from the second timeslot 234 by a short guard interval 240. In the second timeslot 234, the first sensor 130 and the first actuator 120 simultaneously transmit 430 the first sensor's uplink packet on channel 2, and the second sensor 130 and the third actuator 120 simultaneously transmit 430 the second sensor's uplink packet on channel 3. The controller 110 listens 440 to receive the simultaneously retransmitted uplink packets using Radio 1 on Channel 2 and Radio 2 on Channel 3.

In the embodiments described above, the scheduling and/or transmission of downlink instructions 125 for each of a system's actuators 120 and uplink feedback 135 from each of the system's sensors 130 within a maximum cycle time is achieved using a transmission schedule (MAC layer design) employing time division duplexing (TDD), frequency division duplexing (FDD), time division multiple access (TDMA), frequency division multiple access (FDMA), packet aggregation, and cooperative retransmissions. TDD is used to perform both downlink and uplink communications within a single control cycle. FDD is used to transmit uplink feedback 135 on different channels to downlink instructions 125. TDMA is used to allow different actuators 120 and sensors 130 to receive and transmit in different timeslots within the control cycle. FDMA allows multiple radios 112 of the controller 110 to communicate with different actuators 120 and/or sensors 130 simultaneously. Packet aggregation allows downlink instructions 125 for multiple actuators 120 to be aggregated into a single packet rather than transmitted as the payloads of multiple different packets. Cooperative retransmissions in the second timeslots 234 of uplink slot pairs 230 increase the reliability of uplink feedback 135 being successfully received by a controller.

In some embodiments, channel-hopping techniques may also be employed between different control cycles; for example to vary the uplink and/or downlink channels used.

FIG. 5 shows the scheduled actions of the controller 110, actuators 120 sensors 130 of a system comprising a controller 110 with three radios 112, three actuators 120, and three sensors 130.

The system 100 has maximum cycle time of 200 µs. The system 100 uses fixed payloads of 2 bytes for downlink instructions to individual actuators 120 and uplink feedback from individual sensors 130. The system 100 uses downlink windows 220 with 56 µs duration within which downlink instructions 125 for up to three actuators may be aggregated into a single packet. The system 100 further uses uplink slot pairs 230 comprising two uplink timeslots 232, 234, each with a duration of 40 µs. The system 100 further uses a switching interval 250 of 40 µs. Therefore, the controller 110 of the system of FIG. 5 determines a cycle transmission structure 200 comprising a single downlink window 220 and a single uplink slot pair 230 in the same manner as the system described with reference to FIG. 4.

The three actuators 120 of the system 100 are all assigned to listen to receive aggregated downlink instructions from Radio 1 of the controller 110 on Ch 1 in the downlink window 220. The three sensors 130 are each scheduled to transmit to a different radio 112 of the controller 110 on a different channel in the same uplink slot pair 230 and are each paired with a different one of the actuators 120.

Figure 6:
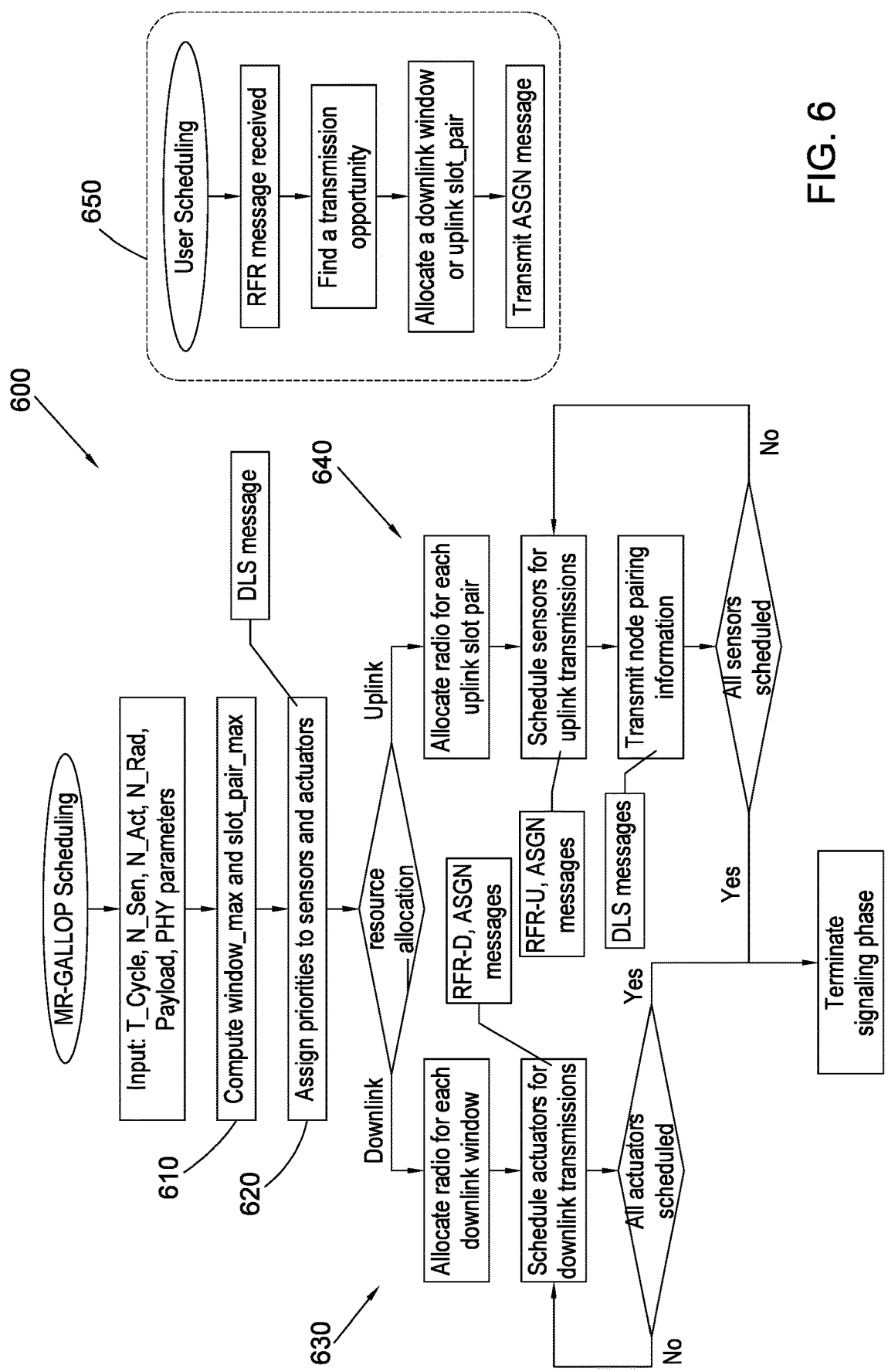
FIG. 6 is a flowchart of an embodiment of a method for scheduling uplink and downlink transmissions in a closed-loop control system.

FIG. 6 shows a flowchart 600 of an embodiment of a method for scheduling uplink and downlink transmissions in a closed-loop control system as described above. The method comprises determining 610 maximum numbers of downlink windows 220 and of uplink slot pairs 230 based on a maximum cycle time, numbers of actuators 120 and sensors 130, a number or controller radios 112, and on a parameters of the transmissions payloads and the physical layer via which they are transmitted.

The method subsequently comprises assigning 620 priorities to each of the actuators 120 and sensors 130 in an initial DLS message, before separately scheduling 630 actuators 120 to listen to receive downlink transmissions and scheduling 640 sensors 130 to transmit uplink transmissions. The steps taken by the controller 110 to assign resources to a single resource-requesting actuator 120 or sensor 130 are shown in a separate box 650.

Embodiments described herein relate to methods for synchronizing the clocks of nodes of a single hop wireless network such as a single hop wireless closed-loop control system.

Figure 7:
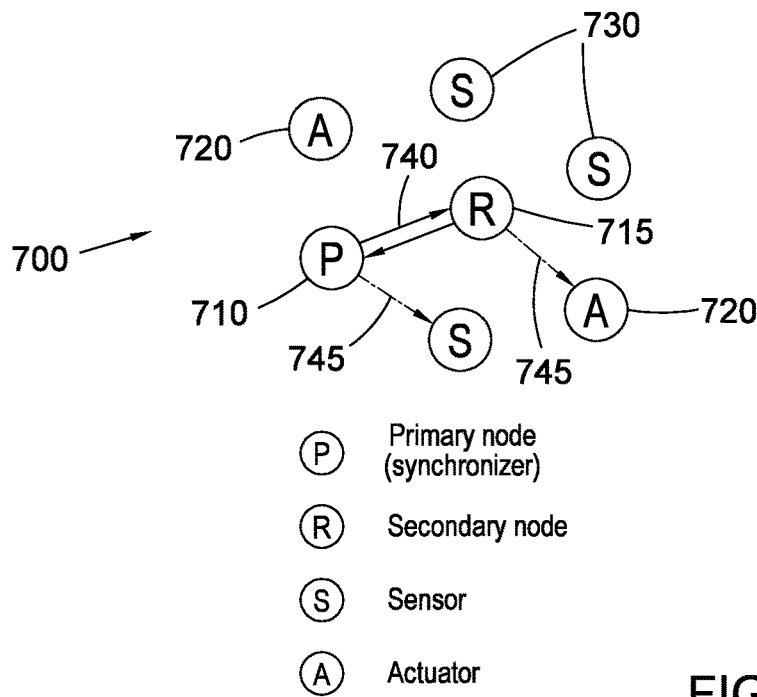
FIG. 7 shows an example of a single hop network defined by a closed-loop control system.

FIG. 7 shows an example of a single hop network defined by a closed-loop control system 700 in which an embodiment of a synchronization method is being performed. The system 700 comprises a controller 710 with a plurality of radios, as well as a plurality of actuators 720 and sensors 730, each with a single radio.

The controller 710, the actuators 720 and the sensors 730 are arranged within range of each other and are configured to communicate with each other via a shared transmission medium using one or more shared physical (PHY) layers. The controller 710, the actuators 720 and the sensors 730 each define a single network node of the network 700. The system may comprise any of the features described with reference to the system 100 of FIG. 1.

Embodiments described herein relate to methods of synchronizing one or more nodes with a primary node by exchanging a series of messages between the primary node and a secondary node, with one or more other nodes optionally overhearing one or more of the exchanges messages.

The primary node with which the one or more other nodes are synchronised is preferably a node with a fine grained and/or highly accurate clock, or a node that is synchronized with some other system. If the synchronization method is used to synchronize nodes of a wireless closed loop control system, the primary node may be a controller node of the system. In the example shown in FIG. 7, the primary node is the controller node 710 and is denoted by "P".

The primary node 710 exchanges a series of synchronization messages 740 with a secondary node 715. The secondary node 715 may be a randomly selected node, or may be a node that is specifically selected to be more precisely synchronized with the primary node. If the synchronization method is used to synchronize nodes of a wireless closed loop control system, the secondary node may be an actuator or a sensor. In the example shown in FIG. 7, the secondary node 715 is an actuator denoted by "R".

The series of synchronization messages 740 exchanged between the primary node 710 and the secondary node 715 are shown as solid arrows. Some or all of the synchronization messages may optionally be overheard by any or all of the other nodes 720, 730 of the system. In the example shown in FIG. 7, an actuator 720 overhears one of the synchronization messages 742 transmitted by the secondary node 715 and a sensor 730 overhears one of the synchronization messages 744 transmitted by the primary node 710.

Figure 8:
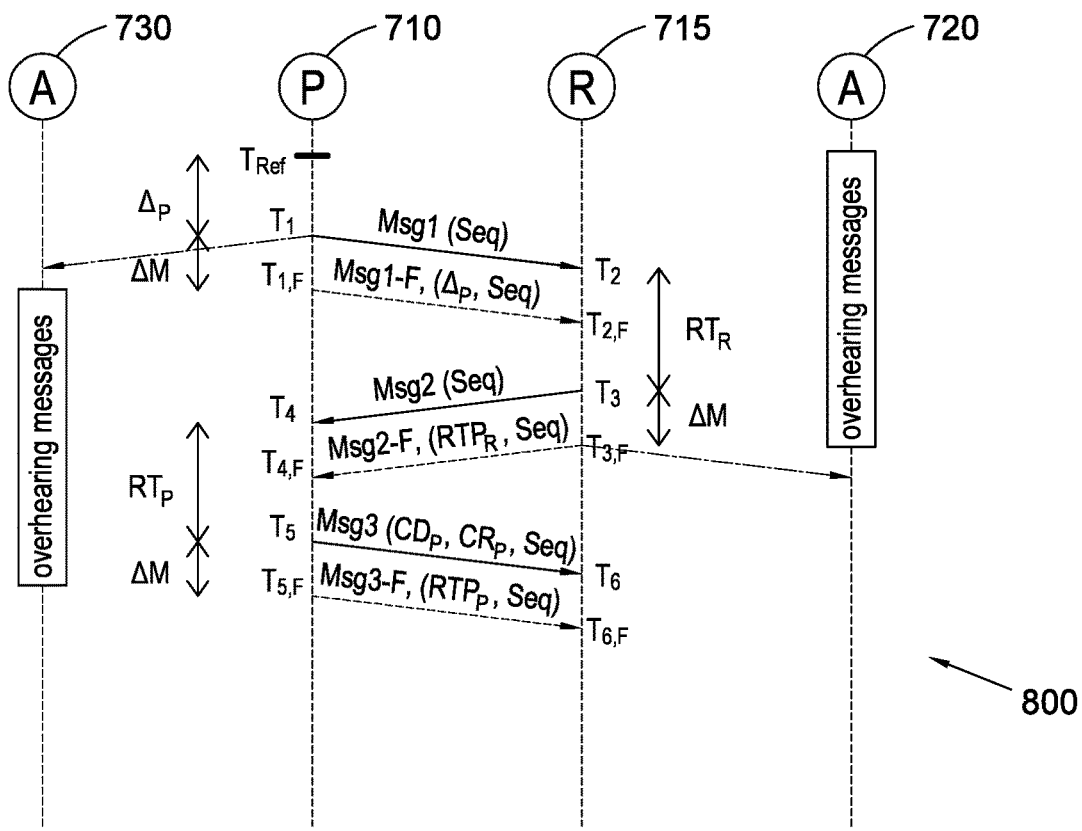
FIG. 8 shows a series of synchronization messages exchanged between the nodes of the system of FIG. 7

FIG. 8 shows a diagram of the series of synchronization messages 740 exchanged between the nodes 710, 715, 720, 730 of the system shown in FIG. 7 over time during a performance of an embodiment of a synchronization method.

The synchronization process 800 is initialised at a reference time $T_{ref}$ as measured by the clock of the primary node 710.

During the synchronization process 800, a plurality of time measurements are exchanged between nodes. Some or all of these time measurements may be time differences between two of the reference time, the times at which the packets are transmitted or received, beginnings or ends of packets, and/or times at which radios of one of the packet transmitting or receiving nodes 710, 715, 720 transitioned between states. Such time differences may advantageously be unaffected by any consistent error in the clock of the measuring node, which may affect absolute timestamps.

In a first step of the synchronization process, the primary node 710 transmits a first synchronization message Msg1 to the secondary node 715. Msg1 is transmitted at time $T_1$ as measured by the clock of the primary node 710, which is some finite delay after $T_{Ref}$. This delay can be deterministic or variable, for example, depending upon the capabilities of the wireless chipset with which the primary node 710 transmits Msg1, but can be measured when Msg1 is transmitted.

Each of the synchronization messages exchanged during the method may contain an element for receiving nodes to differentiate between different synchronization messages of the sequence. In the illustrated embodiment, this element is a sequence number, seq, which is incremented between certain transmissions. In the first message Msg1 and its follow-up message Msg1-F the sequence number, seq, is 1, in the second message, Msg2 and its follow-up message Msg2-F, the sequence number, seq, is 2, and in the third message, Msg3 and its follow-up message Msg3-F, the sequence number, seq, is 3.

Msg1 is received by the secondary node 715 at time $T_2$. This will be at the time $T_1+PD_P$ as measured by the clock of the primary node 710, where $PD_P$ is a propagation delay or path delay defining the time taken between the transmission of a message by the primary node 710 and its receipt by the secondary node 715.

In IEEE 802.15.4 and Bluetooth® 5.0 messages, the time at which a message is transmitted or received by a node is defined by the time at which the length field of the packet defining that message is transmitted or received.

After the transmission time $T_1$ of Msg 1, the primary node 710 transmits a parameter indicative of this time $T_1$ to the secondary node 715. In the illustrated embodiment, this indication is transmitted in a first follow-up message Msg1-F that is transmitted a fixed delay (for example, a fixed delay $\Delta M$) after the transmission of Msg1, at time $T_{1,F}$ as measured by the primary node 710. Msg1-F may include a sequence number, which in the illustrated embodiment is the same sequence number as included in Msg1 and the parameter indicative of $T_1$. Such a first follow-up message, Msg1-F, is received by the secondary node 715 at time $T_{2,F}$ as measured by the clock of the second node, which is at the time $T_1+PD_P+\Delta M$ as measured by the clock of the primary node 710.

However, in alternative embodiments in which the primary node is configured to modify the payload of the first message as it is transmitted, this indication may be transmitted within the first message itself, in which case the first follow-up message Msg1-F may be omitted.

Nodes may measure times such as transmission and reception times of packets, the beginnings and ends of packets being transmitted or received, differences therebetween, and/or indications thereof, based on interrupts (such as an interrupt service routines), and/or when their radios transition to a transmit or receive state, for example from preceding wait states. In some embodiments, a pin of the radio may transition at such times and this may be used to measure the times or time differences.

Figure 9A:
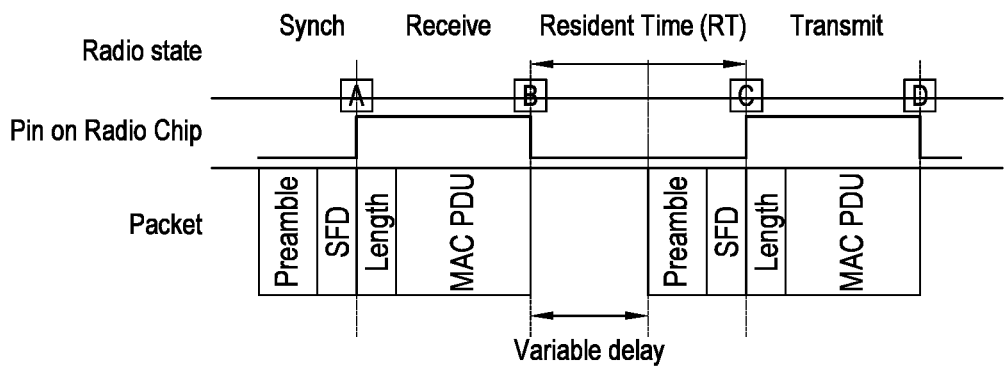
FIGS. 9a and 9b show packet structures of IEEE 802.15.4 and Bluetooth® 5.0 messages respectively during receipt of a first message and transmission of a subsequent message.
Figure 9B:
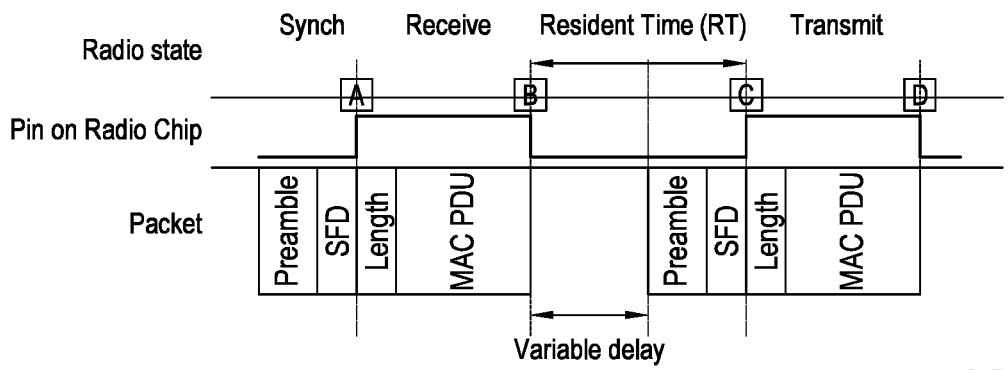
Figure 10:
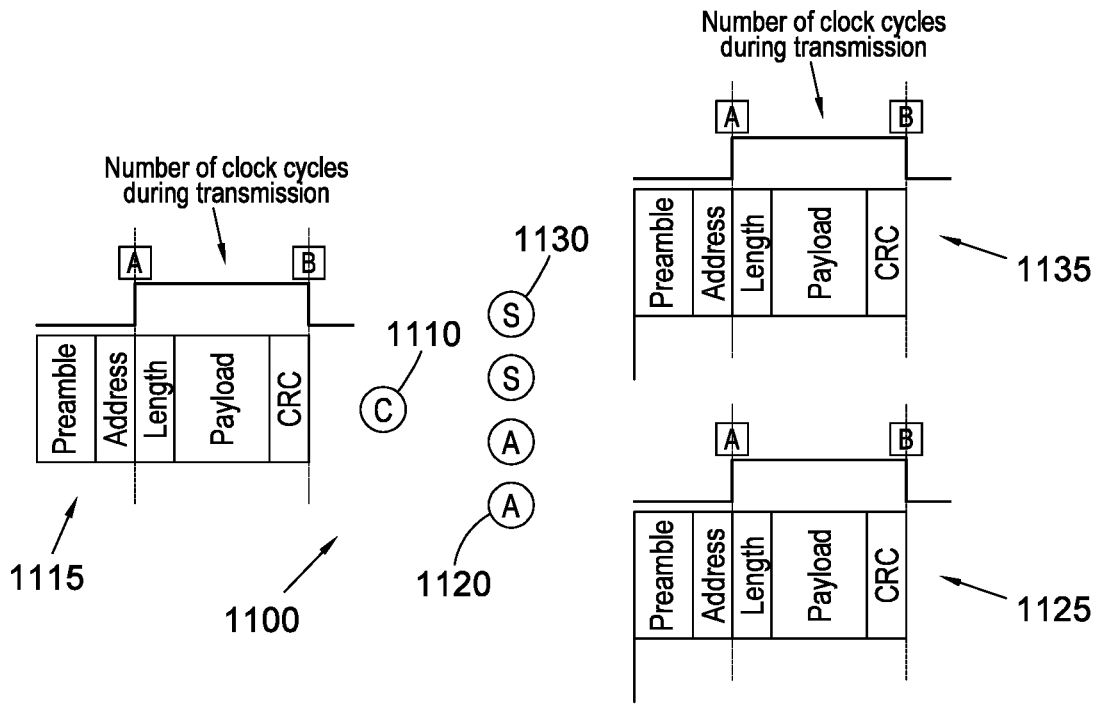
FIG. 10 shows an example of correction of a rate offset during a control cycle of a closed-loop control system.

FIGS. 9a and 9b show examples of radio state changes and radio pin transitions of radios during transmission and reception of packets for IEEE 802.15.4 and Bluetooth® 5.0 messages respectively. The pin of the radio transitions at point A at the start of the length field of a received packet, at which point the radios transitions to a receive state, and at point B after the entire packet is received, at which point the radios transitions from the receive state (for example to a wait state). The pint transitions at point C at the start of the length field of transmitted packets, at which point the radios transitions to a transmit state, and at point D after the entire packet is transmitted, at which point the radios transitions from the transmit state (for example to a wait state).

The parameter indicative of the transmission time $T_1$ of Msg1 that is transmitted by the primary node 710 may be or correspond to a difference between $T_1$ and an earlier time measured by the primary node. For example the parameter may be a time difference between the reference time $T_{ref}$ and the start of Msg1 given by $\Delta_p = T_1 - T_{ref} - T_{Pre}$, where $T_{Pre}$ is the duration of a packet's elements preceding the length field that defines the transmission/receipt time of the packet. For an IEEE 802.15.4 packet, $T_{Pre}$ is given by the sum of the transmission time of the preamble and of the start of frame delimiter (SFD). For a Bluetooth® 5.0 packet, $T_{Pre}$ is given by the sum of the transmission time of the preamble and an address.

FIG. 9a and FIG. 9b show the packet structures of IEEE 802.15.4 and Bluetooth® 5.0 messages respectively during receipt of a first message and transmission of a subsequent message.

In alternative embodiments, the parameter indicative of $T_1$ may be the time difference between $T_{ref}$ and $T_1$ without deducting $T_{Pre}$, or may be $T_1$ as measured by the clock of the primary node 710.

A parameter indicative of $T_1$ in the form of a difference between $T_1$ and an earlier time also measured by the primary node may advantageously be independent of any consistent error in the primary node's time measurements.

After the secondary node 715 receives Msg1 and the parameter indicative of $T_1$, it may use the time at which it received Msg1, T2, the parameter indicative of $T_1$ contained by Msg1-F, and an estimate of $PD_P$ to calculate the time offset of its clock relative to the clock of the primary node 110. If an estimate of $PD_P$ is known to the secondary node 715 upon the receipt Msg1 and the parameter indicative of $T_1$, the time offset may be calculated at this stage. Alternatively, the calculation may be deferred until after an estimate of $PD_p$ is obtained, or the estimate may be defined as a function of $PD_P$.

Such a time offset may be given by $TO = T_2 - T_{Pre} - PD_P - \Delta_p - T_{Ref}$, or alternatively, by $TO = T_2 - PD_P - T_1$, which may give the time offset of the secondary node 715 relative to the primary node 710 at the time at which it receives Msg 1.

Any other node which overhears Msg1 and the indication of $T_1$ may be able to calculate the time offset of its clock relative to the clock of the primary node 110 in the same manner, and may do so.

The time offset between a pair of nodes, such as the primary node 710 and the secondary node 715 may vary over time if their clocks run at different rates. This may be compensated for using a rate offset, which is calculated later in the synchronization method.

After the receipt of Msg1-F, the secondary node 715 transmits a second message, Msg2, to the primary node 710. Msg2 is transmitted by the secondary node 715 at time $T_3$ as measured by the clock of the secondary node and is received by the primary node 710 at time $T_4$ as measured by the clock of the primary node 710.

In the illustrated embodiment, the payload of the second message, Msg2, comprises a sequence number that is incremented sequence number of Msg1 and Msg1-F. The time, $T_4$, at which the second message, Msg2, is received by the primary node 710 may be measured for use in subsequent calculations.

After the transmission time $T_3$ of Msg 2, the secondary node 715 transmits a parameter indicative of the residence time $RT_R$ in the secondary node 715 between the end of the receipt of Msg1 and the transmission time of Msg2 by the secondary node 715. This parameter is transmitted to at least the primary node 710.

The parameter may be transmitted in a second follow-up message Msg2-F that may be transmitted a fixed delay after the transmission of Msg2 at time $T_{3,F}$ as measured by the secondary node 715, and which may be received by the primary node 710 at time $T_{4,F}$ as measured by the clock of the primary node 710. The fixed delay may be equal to the fixed delay ΔM between the transmission of Msg1 and Msg1-F. In the illustrated embodiment, the second follow-up message Msg2-F includes the same sequence number as Msg2.

However, in alternative embodiments in which the secondary node 715 is configured to modify the payload of the second message as it is transmitted, this indication may be transmitted within the second message itself, in which case the second follow-up message Msg2-F may be omitted.

The residence time $RT_R$ of the secondary node 715 includes the delay between the end of the receipt of Msg1 and the start of the transmission of Msg2, which may be deterministic or variable, as well as the duration of packet elements preceding the length field of Msg2, as shown in FIGS. 9a and 9b.

The secondary node may transmit one or parameters indicative of the sum of the residence time $RT_R$ and the transmission time of Msg1. In some such embodiments, the parameter indicative of the residence time $RT_R$ in the secondary node 715 may a residence time parameter $RTP_R$ indicative of, or given by the sum of the residence time and the parameter indicative of $T_1$ as described above. For example, $RTP_R = RT_R + \Delta_p = RT_R + T_1 - T_{ref} - T_{Pre}$. Alternatively, the parameter indicative of $RT_R$ may be transmitted along with a parameter indicative of $T_1$ as described above. Such embodiments may advantageously enable nodes 720, 730 other than the primary node 710 that overhear the message containing the parameter indicative of $RT_R$ to calculate the time offset of their clocks relative to the clock of the primary node 710. This is described in more detail below.

In some embodiments, the parameter indicative of the residence time may be the residence time $RT_R$ itself, or may be the transmission time $T_3$ of Msg2 by the secondary node 715, from which the primary node 710 could determine the residence time from $T_1$ and the propagation delay between the primary and secondary nodes 710, 715.

After receiving Msg2, the primary node 710 may transmit a parameter indicative of the time $T_4$ at which it received Msg2 to the secondary node 715.

The parameter indicative of $T_4$ may be transmitted in a third message, Msg3, which may be transmitted by the primary node 710 at time $T_5$ as measured by the clock of the primary node 710 and which may be received by the secondary node 715 at time $T_6$ as measured by the clock of the secondary node 715. In the illustrated example, the parameter is transmitted in Msg3, along with a sequence number that is incremented from the sequence number of Msg2 and Msg2-F. Alternatively, the parameter indicative of $T_4$ may be transmitted in a subsequent third follow-up message Msg3-F described below.

The parameter indicative of the time $T_4$ at which the primary node 710 received Msg2 may be calculates a correction factor, $CD_P$, for the propagation delay between the primary node and the secondary node, which may be calculated by the primary node 710. The correction factor $CD_P$ may be given by the difference between the time at which the message is received and an estimate of the time at which it was transmitted. For example, $CD_P = T_4 - T_{3,p}$, where $T_{3,p}$ is an estimate of the time at which the secondary node 715 transmitted Msg2, which may be estimated by the primary node 710 as $T_{3,p} = T_4 - T_{Pre} - PD_R - T_{Packet}$. Where $PD_R$ is the propagation delay or path delay defining the time taken between the transmission of a message by the secondary node 715 and its receipt by the primary node 710, and $T_{Packet}$ is the duration of the packet's elements starting from the length field that defines the transmission/receipt time of the packet. $T_{Packet}$ may therefore be the duration of the length field and the subsequent payload, including any cyclic redundancy check (CRC).

If an estimate of $PD_R$ is known to the primary node 710 upon the receipt Msg2, the correction factor, $CD_P$, may be calculated at this stage. Alternatively, if an estimate of $PD_R$ is not known to the primary node 710 at this stage, the primary node may calculate and transmit the correction factor, $CD_P$, as a function of the path delay $PD_R$. Alternatively, the primary node may calculate and transmit the correction factor, $CD_P$, using an assumption that the path delay $PD_R$ is zero.

The secondary node can estimate $T_4$ based on the reception of Msg2. This estimate of $T_4$ can be used in an estimate of a path delay between the primary and secondary nodes 710, 715, for example based on the difference between the estimate of $T_4$ and $T_3$. Such a path delay estimate may be averaged with one or more other path delay estimates, for example based on a parameter indicative of residence time in the primary node 710, as described below.

After the transmission time $T_5$ of Msg3, the primary node 710 transmits a parameter indicative of the residence time $RT_P$ in the primary node 710 between the end of the receipt of Msg2 and the transmission of Msg3. This parameter is transmitted to at least the secondary node 715.

The parameter indicative of $RT_P$ may be transmitted in a third follow-up message Msg3-F that may be transmitted a fixed delay after Msg3. The fixed delay may be equal to the fixed delay $\Delta M$ between the transmission of Msg1 and Msg1-F and/or the fixed delay between the transmission of Msg2 and Msg2-F. Msg3-F may be transmitted by the primary node 710 at time $T_{5,F}$ as measured by the clock of the primary node 710 and may be received by the secondary node 715 at time $T_{6,F}$ as measured by the clock of the secondary node 715. In the illustrated embodiment, the third follow-up message Msg3-F includes the same sequence number as Msg3.

However, in alternative embodiments in which the primary node 710 is configured to modify the payload of the third message as it is transmitted, this indication may be transmitted within the third message itself, in which case the third follow-up message Msg3-F may be omitted.

The residence time $RT_P$ of the primary node 710 includes the delay between the end of the receipt of Msg2 and the start of the transmission of Msg3, which may be deterministic or variable, as well as the duration of packet elements preceding the length field of Msg3, as shown in FIGS. 9a and 9b.

In some embodiments, the parameter indicative of $RT_P$ may be a residence time parameter $RTP_P$ given by the sum of the residence time and the parameter $\Delta_p$ as described above, such that $RTP_P = RT_P + \Delta_p = RT_P + T_1 - T_{ref} - T_{Pre}$. Alternatively, the parameter indicative of $RT_R$ may be transmitted along with a parameter indicative of $T_1$ as described above. Such embodiments may advantageously allow nodes 720, 730 other than the primary node 710 that overhear Msg3-F to calculate the time offset of their clocks relative to the clock of the primary node 710. This is described in more detail below.

In other embodiments, the parameter indicative of the residence time $RT_P$ of the primary node may be the residence time $RT_P$ itself, or may the transmission time $T_5$ of Msg3 by the primary node 710.

After receiving the parameter indicative of $RT_P$, the secondary node may calculate an estimate of propagation delays $PD_P$, $PD_R$, between it and the primary node 710 from the parameter indicative of $RT_P$, the transmission time $T_3$ of Msg2 and the receipt time $T_6$ of Msg3.

For example, the secondary node may estimate $T_5$ as $T_{5,p} = T_6 - T_{Pre} - PD_P - T_{Packet}$. The secondary node may thereby estimate $T_4$ as $T_4 = T_{5,p} - RT_P - T_{Packet}$, and may estimate the path delay from the secondary node 715 to the primary node 710 as $PD_R = T_4 - T_3 = T_{5,p} - RT_P - T_{Packet} - T_3 = T_6 - T_{Pre} - PD_P - RT_P - 2 \times T_{Packet} - T_3$. In the illustrated embodiment, where the parameter indicate of $RT_P$ is $RTP_P = RT_P + \Delta_p$, the secondary node 715 may therefore calculate the path delay as $PD_R = T_6 - T_{Pre} - PD_P - RTP_P - \Delta_p - 2 \times T_{Packet} - T_3$.

Alternatively, the secondary node may calculate the propagation delays based on the separation between $T_3$ and $T_6$ being equal to both path delays, plus the separation of $T_4$ and $T_5$, which is equal to the residence time $RT_P$ in the primary node plus $T_{Packet}$. Such that $PD_P + PD_R = T_6 - T_3 - RT_P - T_{Packet}$.

The propagation delays $PD_P$ and $PD_R$ may be calculated using the assumption that $PD_p$, the path delay from the primary node 710 to the secondary node 715, is equal to $PD_R$, the path delay from the secondary node 715 to the primary node 710, such that $PD = PD_P = PD_R$. This assumption may be particularly accurate in low power networks. Alternatively, separate calculations of $PD_P$ and $PD_R$ may be made and an average path delay PD may be calculated therefrom.

Under this assumption, the calculations above may be used to estimate the propagation delay between the primary and secondary nodes 710, 715. Such a propagation delay may then be used to calculate a time offset of the secondary node relative to the primary node as discussed above.

Additionally, after the transmission time $T_5$ of Msg3, the primary node 710 transmits a parameter indicative of $T_5$ and/or the difference in time between $T_1$ and $T_5$. This parameter may be included in the third follow-up message Msg3-F. Alternatively, or additionally, in embodiments in which the primary node 710 can modify its payloads during transmissions, this parameter can be included in the third message Msg3, as the primary node 710 will be able to determine this parameter after the length field is transmitted and insert it into a latter portion of the message.

This parameter may allow the secondary node 715 to determine a difference between the rate of its clock and the clock of the primary node 710. In some embodiments, this parameter may be a rate offset correction factor $CR_P$ given by $CR_P = T_5 - T_1$. Alternatively, this parameter may be $T_5$, the transmission time of Msg3 itself, from which the above mentioned correction factor $CR_P$ using the parameter indicative of $T_1$, the transmission time of Msg 1, described above (such as $\Delta_p = T_1 - T_{ref} - T_{Pre}$).

After receiving the parameter indicative of $T_5$, the secondary node 715 calculates a rate offset, to multiply or divide the rate of its clock by to equal the rate of the clock of the primary node 710. The secondary node 715 may calculate this rate offset by calculating the ratio of the difference between the transmission times of Msg1 and Msg3 to the difference between the receipt times of Msg1 and Msg3. For example, the rate offset of the secondary node may be calculates as $RO=CR_P/(T_6-T_2)$, or as $RO=(T_5-T_1)/(T_6-T_2)$.

In other embodiments, the parameter indicative of $T_5$ may be a number of clock cycles, which may allow the receiving secondary node 715 to calculate the rate offset using a ratio of the number or clock cycles of the primary node 710 between the transmission times of Msg1 and Msg3 to the number of clock cycles of the secondary node 715 between the receipt times of Msg1 and Msg3.

After calculating its rate offset, the secondary node 715 may use it to calculate or recalculate the time offset of its clock relative to the clock of the primary node 110. Such a time offset may be calculated by adjusting the terms in the formula measured by one of the nodes by the rate calculated rate offset. For example, such a time offset may be given by $TO=T_2-PD-(T_{Pre}+\Delta_p+T_{Ref})/RO$, or by $TO=T_2-PD-T_1/RO$, in embodiments in which the rate offset, RO, is the ratio of periods' durations as measured by clock of the primary node 710 to their durations as measured by the clock of the secondary node 715 (which measures $T_2$ and estimates PD).

After the time offset accounting for the rate offset is calculated the rate offset can be applied to the clock of the secondary node to synchronize it with the clock of the primary node.

The method therefore advantageously allows the secondary node 715 to calculate a rate offset and time offset to synchronize its clock against the clock of the primary node 710.

Additionally, the method enables any other node 720, 730 of the network that receives any one of the follow-up messages Msg1-F, Msg2-F, Msg3-F to calculate the time offset of its clock relative to the clock of the primary node using parameters indicative of the node's residence times and of $T_1$ or sums thereof (such as parameters $RTP_R$ or $RTP_P$), any fixed delays between the transmission of messages and their follow up messages (such as fixed delays ΔM); the propagation delay PD between the nodes; and the known duration of the exchanged packets or elements thereof.

For example, a node such as the actuator 720 shown in FIG. 8, which overhears and receives Msg2-F only at time $T_{4,F,O}$ may calculate the time offset of its clock relative to the clock of the primary node 710 based on parameters indicative of the residence time of the secondary node 715 and of $T_1$ (such as the single parameter $RTP_R$ which is indicative of their sum), the fixed delays between the transmission of messages Msg1 and Msg2 and their follow up messages Msg1-F and Msg2-F (such as fixed delays ΔM); the propagation delays between the nodes; and the known duration of the exchanged packets, excluding the packet elements preceding the length field that defines the transmission/receipt time of the packets $T_{Packet}$. For example, such a time offset may be given by: $TO=T_{4,F,O}-T_{Pre}-\Delta M-RTP_R-T_{Packet}-2\times PD$. Where the propagation delay PD may be an estimate of the average of the propagation delays between the primary node 710 and the secondary node 715 and between the secondary node 715 and the overhearing actuator 720. Such an estimate may be calculated from independent estimates of these two propagation delays, or may be calculated from an estimate of one of the two delays, for example based on an assumption that the two propagation delays are approximately equal.

The synchronization of overhearing nodes 720, 730 based on a single message may not be as tight as the synchronization of the secondary node 715 with which the series of synchronization messages are exchanged, as a rate offset cannot be corrected based on a single message and/or because of cumulative propagation delays of previous messages.

Any node which overhears Msg1, Msg3 and one or more messages containing parameters indicative of $T_1$ and $T_5$ or a message containing a single parameter indicative of the difference between them, such as $CR_P$, may calculate its rate offset with respect to the primary node in the same manner as the secondary node, using the ratio of $CR_P$ (or a calculation of the difference between $T_1$ and $T_5$) to the difference between the times at which it receives Msg1 and Msg3.

The above method has been described with reference to nodes which cannot modify their packet structures during their transmissions, which prevents the packets containing accurate parameters indicative of their transmission times. Necessitating the use of follow-up packets to transmit this information. In alternative embodiments, the nodes may be able to modify their packet structure during their transmission (for example, if their wireless chipsets are capable of doing so). In such embodiments, the follow-up messages may be omitted Msg1 may contain the parameter indicative of T1, such as Δp, Msg2 may contain the parameter indicative of a residence time $RT_R$ of the secondary node 715, and Msg 3 may contain the parameter indicative of a residence time $RT_P$ of the primary node 710. The residence times of the secondary and primary nodes may be between Msg1's receipt and Msg2's transmission and between Msg2's receipt and Msg3's transmission respectively.

The synchronization method described above advantageously does not require participation from the whole network and does not require nodes to timestamp messages and/or to exchange such timestamps.

During the method described above, the nodes exchange parameters indicative of measured or calculated times or time differences. These parameters may be values or functions of one or more other variables. A parameter indicative of a given time or time period may be a numerical value of that given time or time period, a value calculated from the given time or time period (and optionally one or more other variables) according to a pre-set formula or a function of one or more other variables including one or more values calculated from the given time or time period according to a pre-set formula. Such parameters may enable another node receiving them to obtain the given time or time period for example, through knowledge of the pre-set formula and any other variables therein.

After synchronizing nodes 710, 715, 720, 730 of a closed loop control system 700 as described above, the nodes can be continuously synchronized based on subsequent transmissions, such as MAC layer transmissions during subsequent control cycles or signalling slotframes.

Further embodiments described herein relate to methods of determining rate offsets for clocks of one or more actuators 1120 and or sensors 1130 relative to the clock of a controller 1110. Such methods may be used to perform continuous synchronisation based on subsequent transmissions following synchronizing nodes as described above.

Such methods comprise transmitting packets of fixed length from the controller 1110 to one or more actuators 1120 and/or from one or more sensors 1130 to the controller 1110, such as during performance of a control cycle (or of a signalling slotframe) as described above. During said transmissions, both the transmitting node and the receiving node may count the number of cycles of their clocks during their receipt or transmission of the packets.

This may be the number of cycles of the clocks during the receipt of the portion of the packets excluding elements before the length field defining the transmission of the packets, as shown in the illustrated packet structures of Bluetooth® 5.0 packets at the controller 1115, at one of the actuators 1125 and at one of the sensors 1135.

The number of clock cycles that pass during transmission or receipt of packets of fixed lengths by different nodes may be compared periodically to determine a ratio between the clock rates of these different nodes.

In some embodiments, the sensors 1130 and actuators 1120 may periodically report the number of clock cycles taken to receive or transmit one or more packets to the controller 1110. The controller 1110 may calculate a rate offset for each sensor 1130 and actuator 1120 relative to its clock as the ratio of the number of clock cycles taken to transmit or receive a packet by that actuator 1120 or sensor 1130 to the number of clock cycles taken by the controller 1110. The controller 1110 may then transmit the calculated rate offset correction to each sensor and actuator. The reporting of the numbers of clock cycles and the transmission of the calculated rate offsets may be included in (or piggybacked on) signalling messages, uplink feedback messages, and/or downlink instructions messages performed in methods as described above.

In other embodiments, the controller 1110 may transmit the number of clock cycles it takes to transmit or receive a packet of a fixed length to the actuator 1120 or sensor 1130 that transmitted or received that packet, or to all actuators 1120 or sensors 1130 that have transmitted or received packets of that length. The sensors 1130 and actuators 1120 may then calculate their rate offsets relative to the clock of the controller node themselves.

In other embodiments, one or more sensors 130 may transmits their number of clock cycles during transmission of a fixed length uplink packet to the controller, allowing the controller 110 to calculate a rate offset relative to each of said one or more sensors 130. The controller may transmit its number of clock cycles during transmission of a fixed length downlink packet to each of one or more actuators 120, allowing each of said one or more actuators to calculate its own rate offset relative to the controller 110.

In such methods, the time offset of the nodes may also be corrected, for example using continuous downlink transmissions.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method for scheduling transmissions from a controller node comprising a plurality of radios to one or more downlink nodes and from one or more uplink nodes to the controller node, the method comprising:
   defining one or more downlink timeslots and one or more uplink timeslots within a maximum cycle time period, wherein the one or more downlink timeslots and the one or more uplink timeslots do not overlap with each other;
   scheduling each of the one or more downlink nodes to listen to receive a respective downlink transmission from a radio of the plurality of radios of the controller node in one of the one or more downlink timeslots on a channel of a plurality of channels such that none of respective downlink transmissions to the one or more downlink nodes conflict with each other; and
   scheduling each of the one or more uplink nodes to transmit a respective uplink transmission to a radio of the plurality of radios of the controller node in one of the one or more uplink timeslots on a channel of the plurality of channels such that none of respective uplink transmissions from the one or more uplink nodes conflict with each other;
   wherein each of the one or more downlink nodes is scheduled to listen to receive the respective downlink transmission on a channel of one or more channels on which another of the one or more downlink nodes is scheduled to listen without any of the respective downlink transmissions to the one or more downlink nodes conflicting with each other;
   wherein each of the one or more uplink nodes is scheduled to transmit the respective uplink transmission on a channel of the one or more channels on which another of the one or more uplink nodes is scheduled to transmit without any of the respective uplink transmissions from the one or more uplink nodes conflicting with each other; and
   wherein each of the one or more downlink nodes and the one or more uplink nodes transmit request messages to the controller node, are scheduled by the controller node, and listen to receive the respective downlink transmission from the controller node.

2. The method according to claim 1, wherein each of the one or more uplink nodes is scheduled to transmit the respective uplink transmission on a channel of the plurality of channels on which none of the downlink nodes are scheduled to listen to receive.

3. The method according to claim 1, wherein any of the one or more downlink nodes that are scheduled to listen receive the respective downlink transmissions on a same channel are scheduled to receive the respective downlink transmission from a same radio of the plurality of radios of the controller node and any of the one or more uplink nodes that are scheduled to transmit the respective uplink transmissions on a same channel are scheduled to transmit the respective uplink transmissions to a same radio of the plurality of radios of the controller node.

4. The method according to claim 3, wherein any of the one or more downlink nodes that are scheduled to listen receive the respective downlink transmissions on different channels are scheduled to receive the respective downlink transmission from different radios of the plurality of radios of the controller node and any of the one or more uplink nodes that are scheduled to transmit the respective uplink transmissions on different channels are scheduled to transmit the respective uplink transmissions to different radios of the plurality of radios of the controller node.

5. The method according to claim 1,
   wherein each the one or more downlink nodes is scheduled to listen to receive the respective downlink transmission in an earliest of the one or more downlink timeslots on a channel that does not cause any of the respective downlink transmissions to the one or more downlink nodes to conflict with each other; and
   wherein each the one or more uplink nodes is scheduled to transmit the respective uplink transmission in an earliest of the one or more uplink timeslots on a channel that does not cause any of the respective uplink transmissions to the one or more uplink nodes to conflict with each other.

6. The method according to claim 1,
wherein the one or more uplink timeslots are a plurality of pairs of uplink timeslots each comprising a first uplink timeslot and a subsequent second uplink timeslot, and
wherein each of the one or more uplink nodes is scheduled to transmit a respective uplink transmission to one of the plurality of radios of the controller node in both uplink timeslots of one of the one or more pairs of uplink timeslots on a channel of the plurality of channels such that none of the respective uplink transmissions from the one or more uplink nodes conflict with each other.

7. The method according to claim 6, further comprising:
pairing at least one of the one or more uplink nodes with at least one of the one or more downlink nodes;
scheduling the at least one downlink node paired with each uplink node to listen to receive the respective uplink transmission transmitted by that uplink node in the first uplink timeslot of the pair of uplink timeslots in which that uplink node is scheduled to transmit;
and scheduling the at least one downlink node paired with each uplink node to listen to transmit the respective uplink transmission transmitted by that uplink node in the second uplink timeslot of the pair of uplink timeslots in which that uplink node is scheduled to transmit.

8. The method according to claim 7, wherein each of the one or more uplink nodes is paired with at least one of the one or more downlink nodes.

9. The method according to claim 1,
wherein the one or more downlink nodes are a plurality of downlink nodes; and
wherein the method further comprises scheduling multiple downlink nodes of the plurality of downlink nodes to listen to receive the respective downlink transmissions during a same downlink timeslot and aggregating the respective downlink transmissions of the multiple downlink nodes into a single packet to be transmitted to the multiple downlink nodes in the downlink timeslot.

10. The method according to claim 1, wherein numbers of downlink timeslots and of uplink timeslots defined within the maximum cycle time are determined based on at least: a duration of the maximum cycle time, a number of downlink nodes, and a number of uplink nodes.

11. The method according to claim 1,
wherein the controller node, the one or more downlink nodes and the one or more uplink nodes are comprised by a closed-loop control system, and
wherein each of the one or more downlink nodes is an actuator and each of the one or more uplink nodes is a sensor.

12. The method according to claim 1, further comprising each of the one or more downlink nodes transmitting a request message to the controller node, the controller node scheduling the each of the one or more downlink nodes to listen to receive the respective downlink transmission from the controller node and transmitting a message specifying a downlink time window in which the each of the one or more downlink nodes is scheduled to listen in to that downlink node; and
each of the one or more uplink nodes transmitting a request message to the controller node, the controller node scheduling the each of the one or more uplink nodes to transmit the respective uplink transmission to the controller node and transmitting a message specifying an uplink timeslot pair in which the each of the one or more uplink nodes is scheduled to transmit to the each of the one or more uplink nodes.

13. The method according to claim 1, wherein each of the one or more downlink nodes and the one or more uplink nodes transmit request messages to, are scheduled by, and listen to receive the respective downlink transmission from the controller node in an order of priorities assigned by the controller node.

14. A system comprising a controller node, one or more uplink nodes, and one or more downlink nodes, wherein the controller node comprises a plurality of radios, the system being configured to:
define one or more downlink timeslots and one or more uplink timeslots within a maximum cycle time period, wherein the one or more downlink timeslots and the one or more uplink timeslots do not overlap with each other;
schedule each of the one or more downlink nodes to listen to receive a respective downlink transmission from a radio of the plurality of radios of the controller node in one of the one or more downlink timeslots on a channel of a plurality of channels such that none of respective downlink transmissions to the one or more downlink nodes conflict with each other; and
schedule each of the one or more uplink nodes to transmit a respective uplink transmission to a radio of the plurality of radios of the controller node in one of the one or more uplink timeslots on a channel of the plurality of channels such that none of respective uplink transmissions from the one or more uplink nodes conflict with each other;
wherein each of the one or more downlink nodes is scheduled to listen to receive the respective downlink transmission on a channel of one or more channels on which another of the one or more downlink nodes is scheduled to listen without any of the respective downlink transmissions to the one or more downlink nodes conflicting with each other;
wherein each of the one or more uplink nodes is scheduled to transmit the respective uplink transmission on a channel of the one or more channels on which another of the one or more uplink nodes is scheduled to transmit without any of the respective uplink transmissions from the one or more uplink nodes conflicting with each other; and
wherein each of the one or more downlink nodes and the one or more uplink nodes transmit request messages to the controller node, are scheduled by the controller node, and listen to receive the respective downlink transmission from the controller node.

15. A controller node comprising a plurality of radios, the controller node being configured to:
transmit a respective downlink transmission packet to each of one or more downlink nodes using a radio of the plurality of radios in a downlink timeslot of one or more downlink timeslots on a channel of a plurality of channels such that none of respective downlink transmissions to the one or more downlink nodes conflict with each other; and
listen to receive a respective uplink transmission from each of one or more uplink nodes using a radio of the plurality of radios in an uplink timeslot of one or more uplink timeslots on a channel of the plurality of channels such that none of respective uplink transmissions from the one or more uplink nodes conflict with each other;

wherein each of one or more downlink transmission packets is transmitted on a channel of one or more channels on which a downlink transmission packet to another of the one or more downlink nodes is transmitted without any of the respective downlink transmissions to the one or more downlink nodes conflicting with each other;

wherein each of one or more uplink transmission packets is listened for on a channel of the one or more channels on which another of the one or more uplink transmission packets is listened for without any of the respective uplink transmissions from the one or more uplink nodes conflicting with each other;

wherein the one or more downlink timeslots and one or more uplink timeslots are within a maximum cycle time period and wherein the one or more downlink timeslots and the one or more uplink timeslots do not overlap with each other; and wherein each of the one or more downlink nodes and the one or more uplink nodes transmit request messages to the controller node, are scheduled by the controller node, and listen to receive the respective downlink transmission from the controller node.

16. One or more non-transitory storage media comprising computer instructions executable by one or more processors, the computer instructions when executed by the one or more processors causing the one or more processors to perform the method according to claim 1.

17. A method for scheduling transmissions from a controller node comprising a plurality of radios to one or more downlink nodes and from one or more uplink nodes to the controller node, the method comprising:
   defining one or more downlink timeslots and one or more uplink timeslots within a maximum cycle time period, wherein the one or more downlink timeslots and the one or more uplink timeslots do not overlap with each other;
   scheduling each of the one or more downlink nodes to listen to receive a respective downlink transmission from a radio of the plurality of radios of the controller node in one of the one or more downlink timeslots on a channel of a plurality of channels such that none of respective downlink transmissions to the one or more downlink nodes conflict with each other; and
   scheduling each of the one or more uplink nodes to transmit a respective uplink transmission to a radio of the plurality of radios of the controller node in one of the one or more uplink timeslots on a channel of the plurality of channels such that none of respective uplink transmissions from the one or more uplink nodes conflict with each other;

wherein each of the one or more downlink nodes is scheduled to listen to receive the respective downlink transmission on a channel of one or more channels on which another of the one or more downlink nodes is scheduled to listen without any of the respective downlink transmissions to the one or more downlink nodes conflicting with each other;

wherein each of the one or more uplink nodes is scheduled to transmit the respective uplink transmission on a channel of the one or more channels on which another of the one or more uplink nodes is scheduled to transmit without any of the respective uplink transmissions from the one or more uplink nodes conflicting with each other;

wherein the one or more uplink timeslots are a plurality of pairs of uplink timeslots each comprising a first uplink timeslot and a subsequent second uplink timeslot; and wherein each of the one or more uplink nodes is scheduled to transmit a respective uplink transmission to one of the plurality of radios of the controller node in both uplink timeslots of one of the one or more pairs of uplink timeslots on a channel of the plurality of channels such that none of the respective uplink transmissions from the one or more uplink nodes conflict with each other.

18. The method according to claim 17, further comprising:
   pairing at least one of the one or more uplink nodes with at least one of the one or more downlink nodes;
   scheduling the at least one downlink node paired with each uplink node to listen to receive the respective uplink transmission transmitted by that uplink node in the first uplink timeslot of the pair of uplink timeslots in which that uplink node is scheduled to transmit;
   and scheduling the at least one downlink node paired with each uplink node to listen to transmit the respective uplink transmission transmitted by that uplink node in the second uplink timeslot of the pair of uplink timeslots in which that uplink node is scheduled to transmit.

19. The method according to claim 18, wherein each of the one or more uplink nodes is paired with at least one of the one or more downlink nodes.

\* \* \* \* \*